US012396506B2

(12) United States Patent
Ng et al.

(10) Patent No.: US 12,396,506 B2
(45) Date of Patent: Aug. 26, 2025

(54) RETROREFLECTIVE APERTURED FABRIC AND GARMENT

(71) Applicant: 3M INNOVATIVE PROPERTIES COMPANY, St. Paul, MN (US)

(72) Inventors: Lok-Man Ng, Hsinchu (CN); Michael A. McCoy, St. Paul, MN (US); Shri Niwas, Maple Grove, MN (US); Ying Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 359 days.

(21) Appl. No.: 18/024,333

(22) PCT Filed: Sep. 15, 2021

(86) PCT No.: PCT/IB2021/058421
§ 371 (c)(1),
(2) Date: Mar. 2, 2023

(87) PCT Pub. No.: WO2022/064327
PCT Pub. Date: Mar. 31, 2022

(65) Prior Publication Data
US 2023/0276881 A1 Sep. 7, 2023

Related U.S. Application Data

(60) Provisional application No. 63/082,841, filed on Sep. 24, 2020.

(51) Int. Cl.
*A41D 31/32* (2019.01)
*A41D 13/01* (2006.01)
(Continued)

(52) U.S. Cl.
CPC .......... *A41D 31/325* (2019.02); *A41D 13/01* (2013.01); *B32B 5/028* (2013.01); *B32B 7/12* (2013.01);
(Continued)

(58) Field of Classification Search
CPC ...... A41D 31/325; A41D 13/01; A41D 27/28; B32B 5/028; B32B 7/12; B32B 37/144;
(Continued)

(56) References Cited

U.S. PATENT DOCUMENTS 6,859,941 B2    3/2005  Koppes
6,974,610 B1   12/2005  Koppes
(Continued)

FOREIGN PATENT DOCUMENTS

AU    2011203099 B2    3/2014
CN      202735532 U    2/2013
(Continued)

OTHER PUBLICATIONS

3M™ Scotchlite™ Reflective Material, Product Guide, 2017, 6 pages.
(Continued)

*Primary Examiner* — Mariam Qureshi
(74) *Attorney, Agent, or Firm* — Kenneth B. Wood

(57) ABSTRACT

A breathable, high-visibility garment comprising an apertured fabric and a non-occlusive, unsupported, retroreflective laminate that is adhesively bonded to an outer major surface of at least one region of the apertured fabric.

18 Claims, 8 Drawing Sheets

(51) Int. Cl.
  *B32B 5/02* (2006.01)
  *B32B 7/12* (2006.01)
  *B32B 37/14* (2006.01)

(52) U.S. Cl.
  CPC ........ *B32B 37/144* (2013.01); *B32B 2255/26* (2013.01); *B32B 2262/0276* (2013.01); *B32B 2264/202* (2020.08); *B32B 2307/416* (2013.01); *B32B 2307/422* (2013.01); *B32B 2307/724* (2013.01); *B32B 2437/00* (2013.01)

(58) Field of Classification Search
  CPC ........ B32B 2255/26; B32B 2262/0276; B32B 2264/202; B32B 2307/416; B32B 2307/422; B32B 2307/724; B32B 2437/00; B32B 37/04; B32B 2264/101; B32B 5/026; B32B 2262/0261; B32B 2262/062; B32B 2307/306; B32B 5/024
  See application file for complete search history.

(56) References Cited

U.S. PATENT DOCUMENTS

| | | | |
|---|---|---|---|
| 7,246,380 | B2 | 7/2007 | Gardner et al. |
| 7,600,269 | B2 | 10/2009 | Feduzi et al. |
| 8,070,905 | B2 | 12/2011 | Brennan |
| 8,256,025 | B2 | 9/2012 | Feduzi et al. |
| 9,044,055 | B2 | 6/2015 | Hehenberger |
| 10,618,347 | B2 | 4/2020 | Chi |
| 2006/0040575 | A1* | 2/2006 | Kelleher ............ A41D 31/08 442/72 |
| 2008/0030856 | A1* | 2/2008 | King ............ A41D 13/01 359/518 |
| 2014/0289929 | A1* | 10/2014 | Stansberry ......... A41D 13/0012 2/102 |
| 2015/0096674 | A1* | 4/2015 | Brennan ............ B32B 7/06 156/253 |
| 2017/0131444 | A1 | 5/2017 | Xia et al. |
| 2017/0146704 | A1* | 5/2017 | Edwards ............ G02B 5/128 |
| 2017/0276844 | A1 | 9/2017 | McCoy et al. |
| 2017/0293056 | A1 | 10/2017 | Chen-Ho et al. |
| 2020/0264349 | A1 | 8/2020 | Chen-Ho et al. |
| 2020/0264350 | A1 | 8/2020 | Gotrik et al. |
| 2020/0264352 | A1 | 8/2020 | Chen-Ho et al. |

FOREIGN PATENT DOCUMENTS

| | | |
|---|---|---|
| CN | 203606525 U | 5/2014 |
| CN | 104354446 | 2/2015 |
| CN | 104678470 A | 6/2015 |
| CN | 204374461 U | 6/2015 |
| CN | 104834039 A | 8/2015 |
| CN | 106443849 A | 2/2017 |
| CN | 110983793 A | 4/2020 |
| EP | 0498581 B1 | 6/1996 |
| EP | 0917888 | 5/1999 |
| EP | 1957271 B1 | 1/2012 |
| KR | 20100085373 A | 7/2010 |
| TW | 651450 B | 2/2019 |
| WO | 2007045011 A1 | 4/2007 |
| WO | 2018236783 A2 | 12/2018 |
| WO | 2019003158 A1 | 1/2019 |
| WO | 2019084297 A2 | 5/2019 |
| WO | 2020136531 A1 | 7/2020 |
| WO | 2020136567 A1 | 7/2020 |
| WO | 2022064347 A1 | 3/2022 |

OTHER PUBLICATIONS

3M™ Scotchlite™ Reflective Materials—Transfer Films Technical Data Sheet, Jan. 2020, 8 pages.
3M™ Scotchlite ™Reflective Material Consumer Solutions Products, Aug. 2020, 6 pages.
Fouda, "Determination of Pore Size, Porosity and Pore Size Distribution of Woven Structures by Image Analysis Techniques", Journal of Textile Science & Engineering, Sep. 1, 2017, vol. 07, No. 05, pp. 1-9.
International Search Report for PCT International Application No. PCT/IB2021/058421, mailed on Dec. 8, 2021, 4 pages.
TG—A Series, 1 page.
Thermally Conductive Silicones, Technical Bulletin, Intertronics, Oct. 2018, 2 pages.

* cited by examiner

RETROREFLECTIVE APERTURED FABRIC AND GARMENT

CROSS REFERENCE TO RELATED APPLICATIONS

This application is a national stage filing under 35 U.S.C. 371 of PCT/IB2021/058421, filed 15 Sep. 2021, which claims the benefit of U.S. Provisional Patent Application No. 63/082,841, filed 24 Sep. 2020, the disclosure of which is incorporated by reference in its/their entirety herein.

BACKGROUND

Retroreflective materials have been developed for a variety of applications. Such materials are often used e.g. as high-visibility trim materials in clothing to increase the visibility of the wearer. For example, such materials are often added to garments that are worn by firefighters, rescue personnel, road workers, and the like.

SUMMARY

In broad summary, herein is disclosed a breathable, high-visibility garment comprising an apertured fabric and a non-occlusive, unsupported, retroreflective laminate that is adhesively bonded to an outer major surface of at least one region of the apertured fabric. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
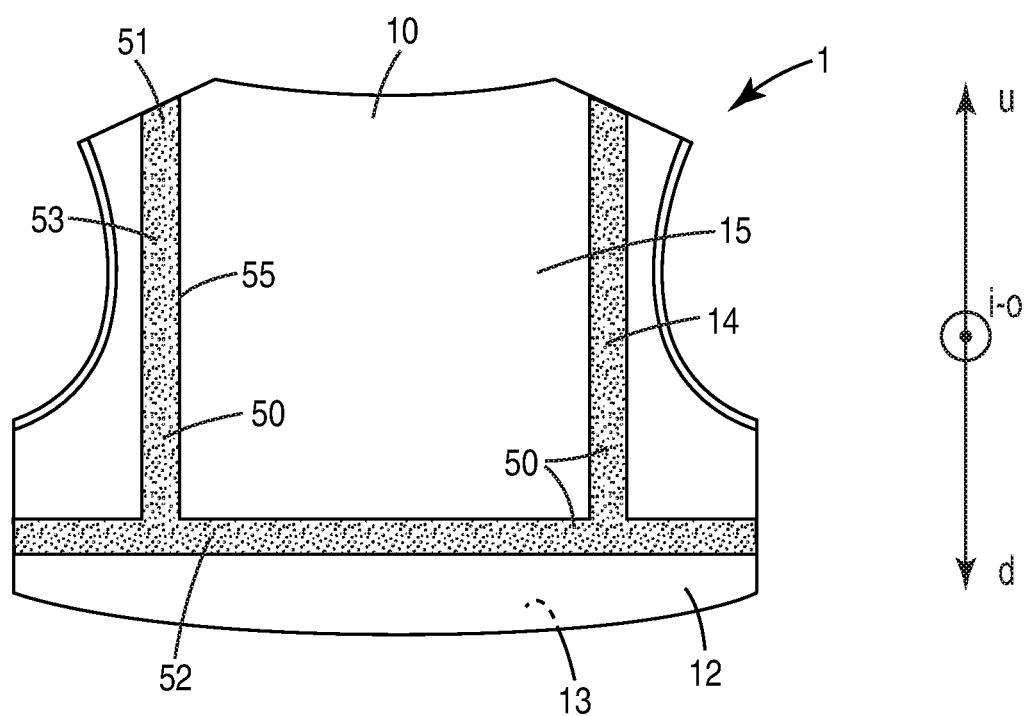
FIG. 1 is a front view of an exemplary high-visibility garment bearing retroreflective laminates in selected regions of the garment.

Like reference numbers in the various figures indicate like elements. Some elements may be present in identical or equivalent multiples; in such cases only one or more representative elements may be designated by a reference number but it will be understood that such reference numbers apply to all such identical elements. All non-photographic figures and drawings in this document are not to scale and are chosen for the purpose of illustrating different embodiments of the invention. The dimensions of the various components are depicted in illustrative terms only, and no relationship between the dimensions, relative curvatures, etc. of the various components should be inferred from the drawings. In particular, the thicknesses of reflective layers in proportion to certain other items are exaggerated for ease of illustration.

As used herein, terms such as "outward", "outer", and the like, as applied to garments, fabrics, retroreflective laminates borne by such fabrics, and so on, refer to the side from which the item will be viewed; that is, the side away from the wearer's body. Terms such as "inner", "inward", and the like, refer to an opposing side; that is, the side that faces toward the wearer's body. Terms such as upward and downward have the usual meaning with regard to a vertical axis established by a wearer of a garment (i.e. a person) standing upright. (The inward-outward directions (i-o) and upward-downward directions (u-d) are indicated in various Figures.) Even for specific items and components (e.g. binder layers, adhesive layers and so on, that are part of a retroreflective laminate), this terminology is with reference to the garment as a whole rather than to the specific item, unless otherwise specified.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter. All averages referred to herein are number-average unless otherwise specified.

DETAILED DESCRIPTION

Disclosed herein is an apertured fabric 10 and a high-visibility, breathable garment 1 that can be made from such a fabric. By a garment is meant an item that, in normal use, is to be donned and worn by a person. By definition, the term garment excludes any item that is to be attached to a garment that is to be donned and worn by a person. Thus, the term garment excludes "trim" items of the general type described later herein.

An exemplary high-visibility, breathable garment 1 in the form of a vest is depicted in FIG. 1. In general, such a garment may take the form of e.g. a vest, jacket, shirt (long-sleeve or short-sleeve), trousers, coverall, and the like. Such a garment will comprise an outer major surface 12, much or all of which is visible when the garment is worn; and, an inner major surface 13 that faces toward the wearer's body and much or all of which may not be visible when the garment is worn.

Such a garment 1 will comprise one or more areas 14 that are retroreflective so as to impart high visibility. In many embodiments, some areas 14 of fabric 10 of garment 1 may be retroreflective, with other areas 15 of fabric 10 not being retroreflective. For example, retroreflective areas 14 may take the form of one or more vertical stripes 51 and one or more horizontal stripes 52, as in the exemplary design of FIG. 1. At least some such retroreflective areas will be provided by a retroreflective laminate 50, as defined and described in detail herein.

In some embodiments a retroreflective laminate 50 as present on a garment may take the form of a continuous structure with a size of at least 50, 100, 150, or 200 square cm. For example, such a continuous structure may take the form of a horizontal or vertical stripe of the general type shown in FIG. 1. (In various embodiments, such stripes may comprise a width of at least 25, 35, or 50 mm.) In other embodiments, retroreflective laminates may take the form of numerous, relatively small-scale structures e.g. that each occupy an area of less than 50, 30, 20, 10, 5, 2 or 1 square cm. In some embodiments, such small-scale structures may be "discrete islands" of the type described in co-pending U.S. Provisional Patent Application 63/082,616, entitled Fabric and Garment Comprising Discrete Islands of Retroreflective Laminate, filed evendate herewith and incorporated by reference herein, and achieved by employing a stencil in the lamination process in the general manner disclosed in the 83387US002 application. Such small-scale structures may be arranged in close proximity to each other so that they collectively occupy a large-scale area of the garment. For example, small-scale structures in the form of small strips may be arranged to collectively form a large-scale stripe, e.g. of the general appearance shown in FIG. 3 of U.S. Pat. No. 8,256,025. Many variations of these arrangements are possible. For example, a retroreflective laminate may take the form of a large-scale structure (e.g. a stripe that is at least 35 mm wide) that is "continuous" rather than being a collection of discrete sections of retroreflective laminate, but that nevertheless is patterned so as to exhibit internal spaces in which retroreflective laminate is not present. (Such a patterned structure might, for example, resemble FIG. 4 of U.S. Pat. No. 8,256,025.)

Figure 5:
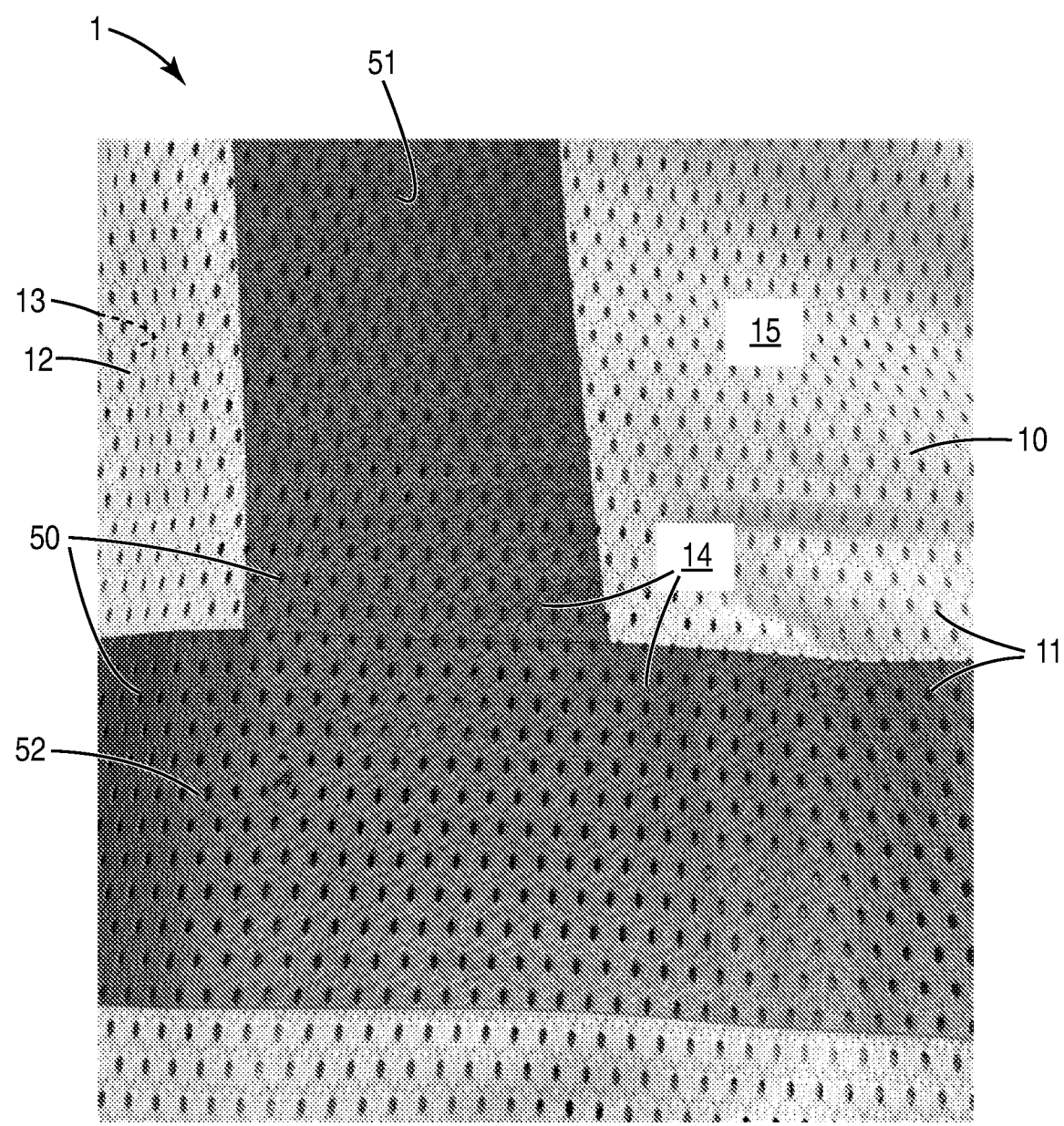
FIG. 5 is a front-view photograph of a portion of an exemplary apertured fabric of a garment, bearing an exemplary retroreflective laminate in selected regions of the garment.

In various embodiments, some retroreflective areas 14 provided by retroreflective laminates 50 may be separated from each other by areas in which the original (e.g. fluorescent) fabric 10 is visible; or, a retroreflective area may be closely abutted against another other retroreflective area (e.g. as for the vertical and horizontal retroreflective stripes 51 and 52 as shown in FIG. 1, and for the two retroreflective areas 14 visible in the photograph of a Working Example sample shown in FIG. 5). In some embodiments, a retroreflective area may extend continuously e.g. around sleeves, trouser legs, or other components of the garment. Many such arrangements are possible.

In various embodiments, the retroreflective areas 15 as provided by one or more retroreflective laminates 50 may collectively make up at least 2, 4, 8, 10, 20, 30, or 40 percent of the total area of the outer major surface of the apertured fabric of the garment. In further embodiments, the retroreflective areas 15 may make up at most 90, 80, 70, 60, 50, 45, 35, 25, or 15 percent of the total area of the outer major surface of the apertured fabric of the garment. (In some embodiments, essentially the entirety of the outer surface of the fabric may be retroreflective.)

Apertured Fabric

A fabric 10 as disclosed herein will be an apertured fabric. By an apertured fabric is meant a fabric that comprises a multiplicity of apertures that collectively occupy a percent open area of at least 3%. (Such an evaluation will be based on the major portions of the fabric, and will exclude any small portions that may be covered e.g. by seams or the like in which some apertures may be covered.) In various embodiments, such apertures may occupy a percent open area of at least 5, 10, 15, or 20%. In further embodiments, such apertures may occupy a percent open area of at most 50, 45, 40, 35, 30, 25, 18, 13, or 8%. In general, the upper limit on the percent open area may be established by the desired visibility that the fabric is to achieve, as will be made apparent from discussions later herein. In particular, if it is desired that the fabric is to meet the criteria set out in ANSI ISEA 107-2015 American National Standard for High-Visibility Safety Apparel and Accessories (hereafter, "ANSI 107-2015"), the % open area may need to fall below a certain limit in order to meet the luminance requirements of the ANSI 107-2015 standard.

Figure 3:
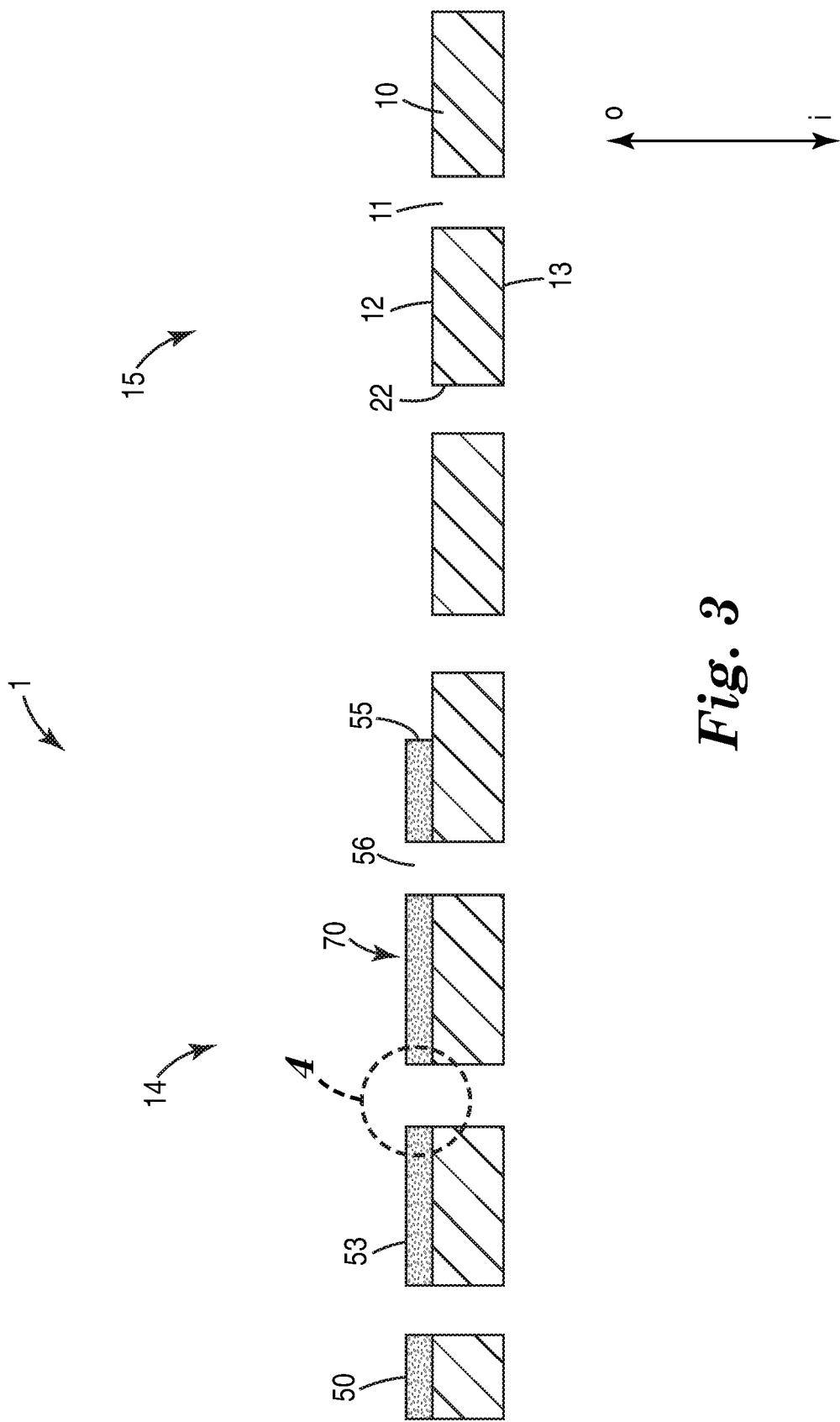
FIG. 3 is a side cross-sectional view of a portion of an exemplary apertured fabric of a garment, bearing an exemplary retroreflective laminate in a region of the fabric.

By an aperture is meant a through-opening (through-hole) that extends through the thickness of the fabric 10 from outer major surface 12 to inner major surface 13, as shown in exemplary, generic representation for apertures 11 of FIG. 3. Such apertures 11 will comprise sidewalls 22 also as indicated in FIG. 3. By definition, in order to qualify as an "aperture", such a through-opening must exhibit a size (area) of at least 0.3 square millimeters.

Broadly speaking, such an aperture 11 may be of two general types, provided in two general ways. A first type is an aperture that is inherently present as a space between filaments (with the word "filaments" broadly embracing threads, strands, yarns and so on) of a textile fabric such as e.g. a woven or knitted fabric. In other words, in some embodiments a fabric may be e.g. a loosely-woven textile in which at least some spaces between warp and weft filaments are sufficiently large to qualify as apertures. (Such apertures may be e.g. generally square in shape when viewed along the inward-outward axis of the fabric, depending on the particular nature of the weave.) This type of aperture, which will result inherently from the process of manufacturing the fabric and will not necessarily require any kind of post-processing to form the aperture, will be referred to as an "interstitial" aperture. (However, it is noted that only openings that exhibit the minimum size (area) referred to above, will qualify as "apertures".) Any such fabric that comprises interstitial openings of such size as to qualify as interstitial apertures will be referred to herein as a "mesh". In any real-life mesh, some openings may be large enough to qualify as apertures, while others may not.

A second type of aperture is a perforation, which by definition is an aperture that is formed in the fabric by way of a post-process performed after the initial production (e.g. by weaving) of the fabric. Such a post-process might be e.g. mechanical perforation (e.g. by die-cutting), water-jet cutting, laser-cutting, needle-punching, and so on. In such cases, the shape of the aperture may be established by the particular method and equipment used, e.g. round, oval, square, hexagonal, and so on. In some embodiments, a combination of interstitial apertures and perforations may be present (in other words, in some embodiments a "mesh" may be perforated). Apertures 11 of apertured fabric 10 are shown in FIG. 3 in in generic representation (and thus may be either interstitial apertures or perforations); the apertures in the photograph of the fabric FIG. 5 are perforations, with an average size of approximately 1.4 square mm and that occupy a percent open area of approximately 7%.

In various embodiments, the apertures 11 of an apertured fabric may exhibit a size of at least 0.5, 1.0, 1.5, or 2.0 square mm; in further embodiments, the apertures may exhibit a size of at most 20, 15, 10, 8, 6, 5, 4, 3, or 2.5 square mm.

In various embodiments, the apertures 11 of an apertured fabric may exhibit an average aspect ratio that is less than 8.0, 6.0. 4.0, 3.0, 2.5, 2.0, 1.5, or 1.1. The aspect ratio is the ratio of the largest dimension of the aperture to the smallest dimension of the aperture, along directions that are normal to the inward-outward axis of the fabric. (A perfectly round aperture will have an aspect ratio of 1.0.) In some instances the apertures may be somewhat elongated (e.g., the apertures 11 of FIG. 5 have an aspect ratio of approximately 2.9). However, as will be discussed later herein, in some embodiments it may be advantageous for the apertures to not have an extremely high aspect ratio (e.g. over 6.0); in other words, in some instances it may be advantageous for the apertures to not be extremely long and narrow.

Figure 4:
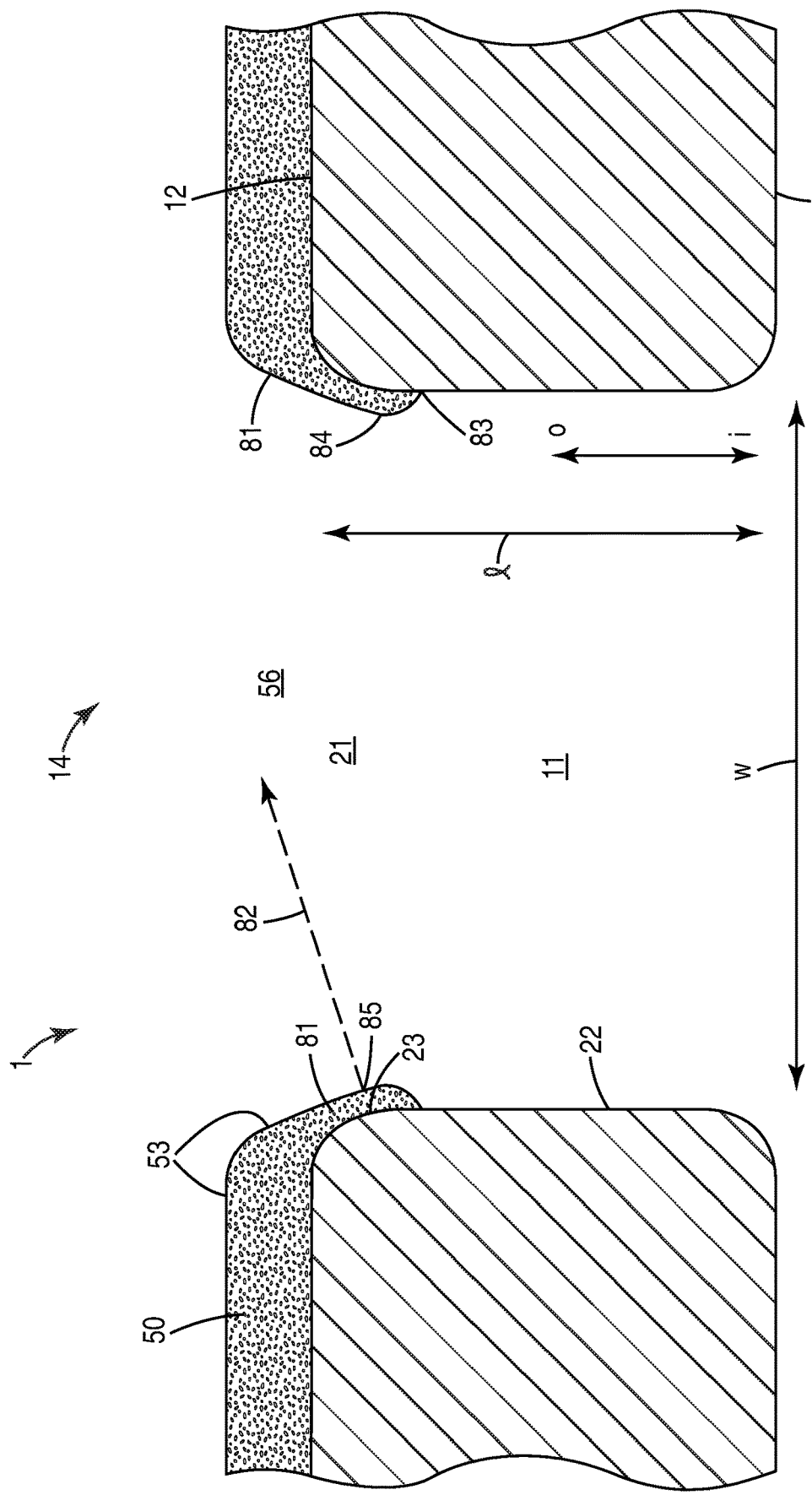
FIG. 4 is a magnified side cross-sectional view of an exemplary aperture of FIG. 3.

In various embodiments, the apertures 11 of an apertured fabric may exhibit an average length-to-width ratio of less than 1.0, 0.6, 0.4, 0.2, or 0.1. (The minimum length-to-width ratio may be e.g. 0.05 or 0.02.) By the length of an aperture is meant the "depth" of the aperture; that is, the distance along the aperture in the inward-outward direction from one major face of the fabric to the other major face of the fabric. By the "width" is meant the average diameter of the aperture (or, the equivalent diameter for a non-circular aperture). Length "l" and width "w" of an exemplary aperture 11 of a fabric 10 are indicated in FIG. 4, which will be discussed in detail later herein. As will be discussed later herein, in some embodiments it may be advantageous for the apertures to have a relatively low length-to-width ratio; that is, to be relatively short and squat rather than tall and narrow. The thickness of the apertured fabric may be any suitable value (e.g. that combines with the aperture dimensions to give the apertures a desired length-to-width ratio). In various embodiments an apertured fabric 10 may exhibit a thickness of at least 0.2, 0.3, 0.4, 0.5, or 0.6 mm. In further embodiments an apertured fabric 10 may exhibit a thickness of at most 2.0, 1.5, 1.0, 0.8, 0.55, or 0.45 mm.

Breathability of Fabric

Fabric 10 will be breathable. By this is meant that apertures 11 will occupy a percent open area of at least 3.0, so as to allow air, and particularly water vapor, to pass through the fabric. In some embodiments, the breathability may be further enhanced by the composition of the fabric (e.g. if it is cotton or a cotton blend) and/or by the presence of spaces between filaments that are too small to qualify as apertures in the sense defined herein, but that nevertheless allow some transport of air and/or water vapor.

The fabric 10 itself may be of any suitable composition and may be made by any suitable process. For example, fabric 10 may be made of e.g. polyester, a polyester/cotton blend, cotton, nylon, and so on. If it is desired that the fabric exhibit heat-resistance and/or flame retardancy as may be beneficial for a particular use, the fabric may include, or be made of, well-known materials such as the products available under the trade designations KEVLAR and NOMEX, CELAZOLE, and PBI-LP. In some embodiments, such a fabric may be e.g. a textile, e.g. a woven or non-woven textile or similar material. However, broadly speaking, any sheet-like material that is suitable for use as a garment, made by any process, may qualify as a fabric.

In many embodiments, a garment 1 may comprise a fabric 10 that is present as a single layer over e.g. at least 60, 70, 80, 90, or 95% of the total area of the garment. That is, except for such areas in which seams, cuffs, lapels, waistbands, liners or the like may be present, the majority of the garment may take the form of a single layer of fabric 10. Such a single layer will be distinguished from a garment that comprises a stack of multiple layers of fabric. (However, in this context, a single layer of fabric will encompass, for example, a layer of fabric that bears a coating e.g. for purposes of water-repellency.) In some embodiments, a fabric may be a multilayer fabric, e.g. in which separate, pre-made fabric layers are attached to each other e.g. by lamination. In such embodiments, the fabric layers should be arranged or processed (e.g. by co-perforating the layers after they have been attached to each other) so that the apertures of the layers are aligned with each other so that sufficient breathability is maintained.

In many embodiments such a fabric 10 may be fluorescent. By "fluorescent" is meant that the fabric (and garment 1 made therefrom) will exhibit a luminance (minimum luminance factor) that meets the criteria set out in ANSI 107-2015. Those of ordinary skill will know that such minimum values vary depending on the particular fluorescent color (for example, a fluorescent yellow fabric must exhibit a minimum luminance factor of 0.70). This may be achieved e.g. by incorporating one or more fluorescent additives into the fabric (e.g. into the filaments that form the fabric). Such fluorescent additives and fabrics are widely available. In such embodiments, the garment may exhibit e.g. bright yellow, orange or green fluorescent areas interspersed with retroreflective areas (e.g. stripes). In the Working Example sample whose photograph appears in FIG. 5, regions 15 of fabric 10 that do not have a retroreflective laminate 50 thereon, exhibit the bright fluorescent yellow color of the original fabric, although this is not visible in the grey-scale photograph of FIG. 5. In this sample, regions 14 exhibit (in ambient light) the light-silver color that is characteristic of many retroreflective layers.

Retroreflective Laminate

As disclosed herein, at least one retroreflective area of a garment 1 will be provided by a retroreflective laminate. The side cross-sectional view of FIG. 3, depicted in exemplary, generic representation, depicts a retroreflective laminate 50 that is disposed on one area 14 of an apertured fabric 10, with no retroreflective laminate 50 being present on another, adjacent area 15 of fabric 10.

Figure 2:
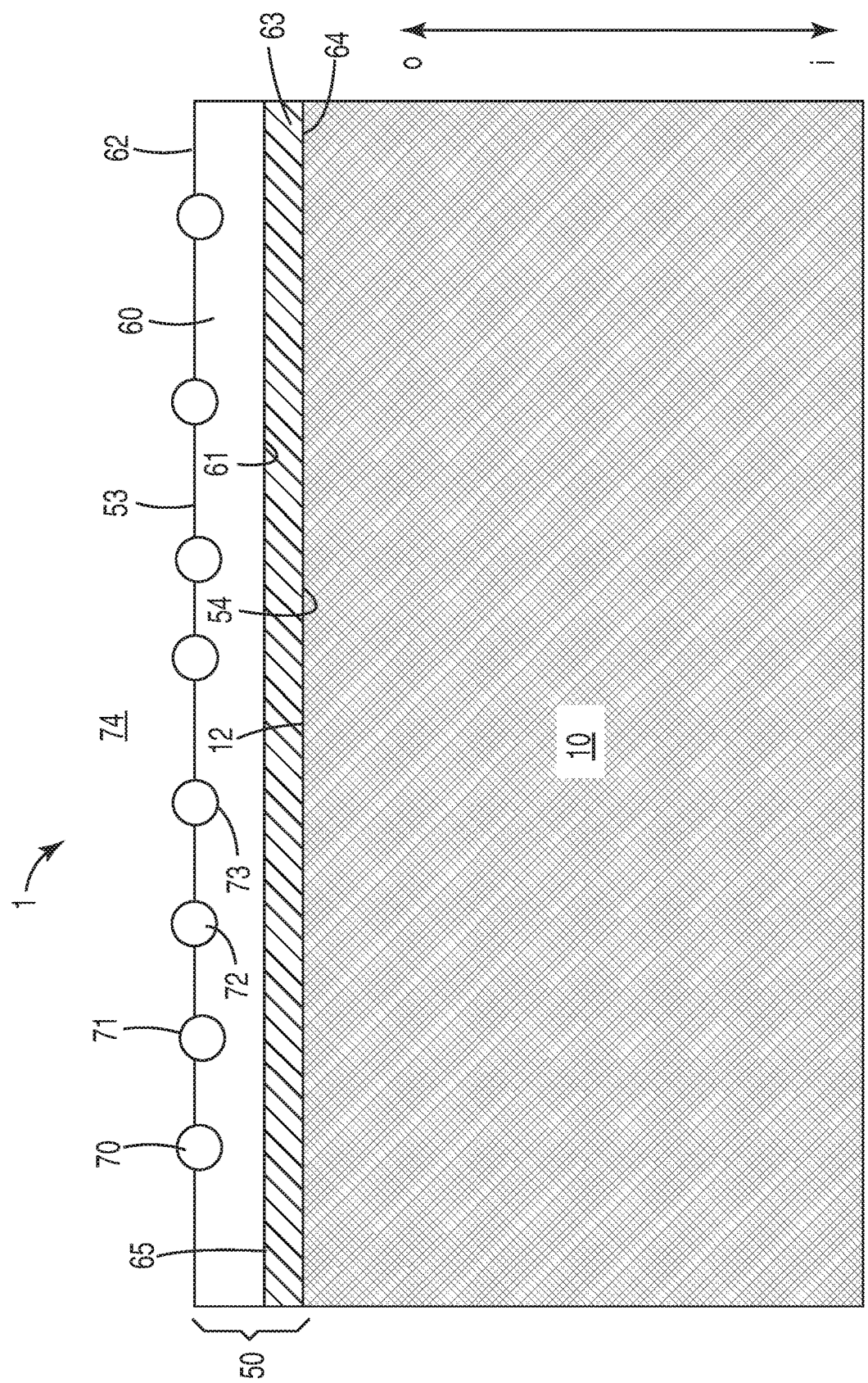
FIG. 2 is a side cross-sectional view of a portion of an exemplary fabric of a garment bearing an exemplary retroreflective laminate.

FIG. 2 is a magnified view of a section of fabric 10 (between apertures, so that no aperture is shown in FIG. 2) bearing an exemplary retroreflective laminate 50. In many embodiments, such a laminate 50 may comprise a binder layer 60, transparent microspheres 70, and an adhesive 63. Adhesive 63 may be conveniently in the form of a continuous layer as shown in FIG. 2; however, in some embodiments such an adhesive may be provided discontinuously e.g. by spraying.

Such a laminate 50 will provide a plurality of retroreflective elements spaced over the length and breadth of a front side of binder layer 60. Each retroreflective element will comprise a transparent microsphere 70 that is partially embedded in binder layer 60 so that portions 71 of microspheres 70 are partially exposed. Binder layer 60 holds and retains transparent microspheres 70 and presents them in such a manner that they can exert a retroreflective effect, and provides the retroreflective laminate 50 with sufficient mechanical integrity to be processed and handled.

Each transparent microsphere 70 has an embedded portion 72 that is seated in binder layer 60. A reflective layer 73 will be disposed between the embedded portion 72 of microsphere 70 and the binder layer 60. The microspheres 70 and the reflective layers 73 collectively return a substantial quantity of incident light towards the light source. That is, light that encounters the retroreflective laminate's outer side passes into and through microspheres 70 and is reflected by reflective layers 73 to again reenter the microspheres 70 such that the light is steered to return toward the light source, in the general manner signified by the term "retroreflection".

Retroreflective laminate 50 includes an adhesive 63 as noted above. In the exemplary depiction of FIG. 2, an inner major surface 64 of adhesive layer 63 is in contact with an outer major surface 12 of fabric 10. An outer major surface 65 of adhesive layer 63 is in contact with an inner major surface 61 of binder layer 60. In the depicted embodiment, an outer major surface 62 of binder layer 60 will provide the outer major surface 53 of laminate 50 (disregarding the protruding portions 71 of microspheres 70); an inner major surface 64 of adhesive layer 63 will provide the inner major surface of laminate 50.

As noted, a retroreflective assembly that is provided as disclosed herein is a retroreflective laminate 50. By a laminate is meant a pre-existing stack (e.g. including a microsphere-bearing binder layer 60 and an adhesive layer 63, as described above) that is to be adhesively bonded as a whole to a fabric 10, by way of the adhesive layer 63 of the laminate. By definition, adhesive layer 63 is a component of retroreflective laminate 50 prior to being brought into contact with fabric 10. Such an arrangement will thus be distinguished from, for example, an approach in which an adhesive is disposed onto a fabric (e.g. by screen-printing) after which a retroreflective item is brought into contact with the adhesive. Those of ordinary skill will appreciate that the herein-disclosed approach, in which the adhesive layer is a pre-existing component of the retroreflective laminate, will cause the resulting product (a fabric layer bearing the retroreflective laminate) to exhibit at least some features that distinguish this product from one that is obtained by, e.g., screen-printing or otherwise disposing an adhesive layer onto the fabric. A retroreflective laminate as disclosed herein will also be distinguished from, e.g., a retroreflective item formed by e.g. directly coating a retroreflective layer onto a fabric.

Unsupported

By definition, a retroreflective laminate 50 is unsupported. By this is meant that laminate 50 does not include any kind of supporting substrate, layer, film, or the like (other than binder layer 60), that serves to provide mechanical integrity at the expense of increased thickness of the laminate. In particular, an unsupported laminate 50 does not comprise any layer of fabric or the like. In this respect, the approach disclosed herein differs markedly from many conventional approaches to providing garments with retroreflectivity. For many years, retroreflectivity has been imparted to garments by providing one or more retroreflective items in the form of "trim"; that is, in the form of a retroreflective layer disposed on a layer of supporting fabric. The "trim" is attached to the garment e.g. by sewing, by ultrasonic bonding, by way of an adhesive, or the like. The result is that two layers of fabric are present (the garment fabric, and the trim fabric). This can reduce the breathability of the garment, can increase the local stiffness of the garment, and so on.

In contrast, in the present approach, a retroreflective laminate 50 is provided directly on the fabric of a garment, without the need for any additional supporting fabric layer. Such an approach eliminates the extra thickness that would be imparted by a supporting layer of fabric, minimizes any impact on breathability and stiffness, and minimizes the rough edges that are typically exhibited by retroreflective "trim". (In some instances, the edge 55 of a retroreflective laminate 50 as shown in FIG. 3 may be so subtle that a person might be able to run their finger along the fabric and not be able to easily tell when the edge of the laminate is encountered.) Thus in some embodiments, a retroreflective laminate as mounted on a fabric of a garment may provide a "low-profile" retroreflective area in which the local thickness of the retroreflective area (the combined thickness of the garment fabric and the retroreflective laminate) may be greater than the thickness of the garment fabric alone, by a factor of less than 1.5, 1.3, or 1.2. By way of a specific example, in some embodiments an apertured fabric may be e.g. 0.4-0.5 mm in thickness and a retroreflective laminate that is to be laminated to the apertured fabric may be e.g. 0.10-0.15 mm in thickness.

Thus in summary, an unsupported retroreflective laminate as disclosed herein will not include any kind of supporting substrate such as a fabric layer. In some embodiments, such a laminate may consist essentially of, or consist of, two major layers: a binder layer, and an adhesive layer to attach the laminate to a fabric of a garment. In this context a major layer is considered to be a structural layer which, by definition, includes binder layers and adhesive layers. A major layer, by definition, excludes optical layers such as retroreflective layers (e.g. vapor-coated metal layers), and the like (such layers will be termed minor layers herein). The condition that the laminate may consist of these two major layers does not preclude the presence of other components, e.g. microspheres, and/or the presence of other layers that are considered herein to be minor layers.

By definition a retroreflective laminate as disclosed herein will comprise more than one major layer. For example, in many embodiments a binder layer 60 and an adhesive layer 63 will be present. The adhesive layer 63 and the binder layer 60 are separate layers, that differ in composition and function, with the binder layer providing the retroreflective elements and with the adhesive layer being used to hold the binder layer in place on the desired fabric. Such arrangements are distinguished from those in which a single major layer (e.g. an adhesive layer that itself provides retroreflective elements) is used. Discrete items that provide retroreflective elements, e.g. transparent microspheres, will not be considered to constitute a "layer" in this context.

In various embodiments a retroreflective laminate (in the absence of any liners) may exhibit a thickness, from its outer surface 53 to its inner surface 54 (e.g. from an outer surface 62 of binder layer 60, to an inner surface 64 of adhesive layer 63, and disregarding any microspheres that protrude above the binder layer) that is from about 20, 40 or 60 microns, to about 300, 200, 150, 100, 80, or 50 microns. In various embodiments a retroreflective laminate may exhibit a thickness, from its outer surface 53 to its inner surface 54 (e.g. from an outer surface 62 of binder layer 60, to an inner surface 64 of adhesive layer 63, and disregarding any microspheres that protrude above the binder layer) that is from about 5, 10, 20, or 30%, to about 80, 60, 50, 40, 35, 25, or 15%, of the thickness of the fabric to which it is attached.

Laminate 50 is adhesively bonded to the outer major surface 12 of an apertured fabric 10, by way of adhesive 63. Adhesive 63 may be of any suitable type that allows the lamination to be performed. In some embodiments such an adhesive 63 may be a pressure-sensitive-adhesive (PSA) at room temperature (21 degrees C.). By definition, such a PSA will meet the well-known Dahlquist criterion of exhibiting a one-second creep compliance of greater than $1 \times 10^{-6}$ cm$^2$/dyne, at 21 degree C.

In other embodiments such an adhesive 63 may be a material that does not exhibit PSA properties at room temperature but can be raised to a temperature (e.g. by performing the lamination in a heated press as described later herein) at which the adhesive bonds to the fabric. Some such embodiments may have the advantage that, if the adhesive is sufficiently non-tacky at room temperature (and at all temperatures to which the adhesive may be exposed during storage, shipping and handling) the adhesive may not need to be covered by a non-stick liner.

In some embodiments, an adhesive may be a material (e.g., a so-called hot melt adhesive) that can be brought up to a temperature at which it can be flowably deposited (e.g. coated or extruded) onto the binder layer, after which it can be cooled to form the adhesive layer. The resulting laminate can be held until such time as it is desired to attach the laminate to a fabric, at which time the adhesive can be heated (e.g. in a platen press as described later herein) to a temperature sufficient to bond the laminate to the fabric.

In some embodiments, an adhesive may be e.g. a thermoplastic material in the form of a film or sheet that can be disposed onto the binder layer by heated lamination rather than by having to fully melt the adhesive material so that it can be disposed on the binder e.g. by coating. The resulting laminate can then be used in similar manner as described above for flowably-deposited hot-melt adhesives. Such materials may have a thickness of, e.g., from 25, 50 or 75 microns, to 150, 125, 100, or 75 microns, and may have a softening point in the range of e.g. 100 to 150 degrees C.

Thus in some embodiments a suitable adhesive may be disposed onto a binder layer, whether by e.g. liquid-coating, spraying, extrusion, or lamination, with the resulting article being stored (with or without a non-stick liner over the adhesive, depending on the characteristics of the particular adhesive) until such time as it is desired to laminate the article to a fabric. In other embodiments a suitable adhesive may be disposed onto the binder layer e.g. by liquid-coating, spraying, extrusion, or lamination, as a part of the lamination process (e.g. immediately before the resulting article is laminated to a fabric).

Various PSAs, hot-melt-flowable adhesives, thermally-activatable adhesive films, and so on, are widely available. Such materials may be made of, or include, e.g. ethylene-vinyl acetate copolymers, acrylate polymers and copolymers, natural rubber polymers, polyolefins, polyamides, polyesters, polyurethanes, polycaprolactones, polycarbonates, styrene block copolymers, and so on. Such materials may be available from suppliers such as e.g. 3M, Bostik (Arkema), Lubrizol, Bemis, Huntsman, Worthen, and Celanese. In some embodiments, the composition of the adhesive may be chosen in view of the fabric that is to be bonded to. For example, an adhesive comprising polyester or the like may be used if the laminate is to be bonded to a fabric that comprises polyester, cotton, a polyester-cotton blend, and so on. Although many such adhesives may be thermoplastic as noted, in some embodiments a thermosettable adhesive may be used, e.g. a reactive hot melt adhesive based on e.g. polyurethanes or polyolefins. Such adhesives are available e.g. from Buhen Adhesive Systems.

Non-Occlusive

Retroreflective laminate 50 is non-occlusive, meaning that laminate 50 does not occlude (close off) the apertures 11 of fabric 10, as evident in FIG. 3. That is, the attaching of laminate 50 to fabric 10 will not cause laminate 50 to "bridge" over, or to otherwise fill, apertures 11. Those of ordinary skill will appreciate that in actual production, an aperture 11 may occasionally be bridged or otherwise filled by the laminate as may occur statistically in any real-life production process; however, by and large, the vast majority of apertures 11 will remain open. This is readily apparent from inspection of FIG. 5, which shows an exemplary Working Example apertured fabric 10 with regions 14 bearing a retroreflective laminate 50 bonded thereto. Essentially all of the apertures 11 in region 14 of fabric 10 that is covered by laminate 50, remain open. Moreover, it does not appear that the presence of laminate 50 reduces the size of apertures 11 by a significant amount. Thus in various embodiments the apertures 11 of a region 14 of fabric 10 bearing a retroreflective laminate 50 will exhibit an average size (in square mm, measured while viewing the apertures along the inward-outward axis) that is at least 40, 60, 70, 80, 85, or 90% of the average size of the apertures of a region 15 that does not bear a laminate 50. (This average size of the apertures in region 14 refers to the size as bounded by the retroreflective laminate present in the apertures and does not refer to the original size of the apertures in the fabric itself.) The percent open area of the apertures in region 14, and the air permeability and breathability exhibited by this region, will remain commensurately similar to that of region 15.

It is noted that this condition of non-occlusion only applies to through-openings of fabric 10 that are large enough to qualify as an aperture. In many cases (in particular if fabric 10 is a mesh that has been perforated, in the general manner of fabric 10 of FIG. 5), smaller holes such as interstitial spaces between filaments, fibers, threads, etc., may be filled and occluded by the adhesive. The arrangements disclosed herein permit such occurrences, as long as the apertures are unoccluded so that the fabric remains breathable.

The above discussions make it clear that apertures 11 of fabric layer 10, and corresponding openings 56 of retroreflective laminate 50, will be aligned with each other along the inward-outward direction of the assembly, e.g. as shown in FIG. 3 and as visible in FIG. 5. However, it will also be clear that such an arrangement can be distinguished from an arrangement in which a retroreflective laminate and a fabric are attached to each other with apertures then being introduced through both items in one operation, e.g. by co-punching.

In the present approach, a pre-made retroreflective laminate 50 comprising at least a binder layer 60 and an adhesive layer 63, is brought together with an apertured fabric 10 so that the adhesive layer contacts a major surface 12 of the apertured fabric 10, in desired regions 14 of the fabric. (Other regions 15 of the fabric may be left as-is, without a retroreflective laminate disposed therein). The application of e.g. heat and/or pressure causes the adhesive 63 to bond to the fabric 10.

The process of bringing a laminate 50 and an apertured fabric 10 together with the use of appropriate heat and/or pressure can be as achieved e.g. by a pair of lamination tools.

In some embodiments the pair of lamination tools may take the form of rolls of a nip-roll apparatus. Such an apparatus might comprise a first backing roll that supports the retroreflective laminate and a second backing roll that supports the fabric, with a suitable gap established at the point of closest approach of the surfaces of the first and second backing rolls. The surfaces of each backing roll may be chosen with any suitable hardness; for example, the surface may be steel or other metal, or may be e.g. equipped with a coating or sleeve of e.g. silicone rubber or the like, of any suitable thickness and durometer.

However, in some embodiments the lamination may be performed by placing the retroreflective laminate and the apertured fabric into a platen press and pressing them together at a suitable temperature and/or pressure. Such a process will be a batch process rather than a roll-to-roll process. Such an approach may be advantageous in allowing the use of fabric that has already been at least partially cut into the shape of a garment, which might be difficult with a nip-roll system. It is noted in passing that the piece of fabric to which the retroreflective laminate (often multiple pieces of laminate) is attached may itself form a garment, e.g. after any final cutting or finishing process. However, in some embodiments a garment may be formed by taking two or more pieces of fabric, at least one of which bears one or more retroreflective laminates, and joining the pieces of fabric together e.g. by sewing. Any such arrangements are encompassed by the approaches disclosed herein.

In use of a platen press, one or both platens may be controlled to a desired temperature (e.g. 160-180 degrees C.). The platens may be brought together with a suitable pressure (e.g. 40-60 psi) and for a suitable time (e.g. from 5, 10, or 15 seconds, up to 60, 40 or 20 seconds). The platens may then be separated and (after waiting for the items to cool to a sufficient extent that the bond between the adhesive and the fabric is adequately established) the apertured fabric, bearing one or more pieces of retroreflective laminate adhesively bonded thereto, may be removed. Suitable presses for such operations may be of the general type available e.g. from Yourway Machinery Co., Ltd., Taiwan. If desired, the lamination apparatus and process may be configured so that a retroreflective laminate is disposed on an apertured fabric in a desired pattern. This may be accomplished e.g. by use of a suitably patterned stencil, by deposition of a heat-resistant masking material onto the adhesive layer of the laminate in a desired pattern, or by any similar method.

As detailed herein, the herein-disclosed process is directed toward producing an apertured fabric with a retroreflective laminate thereon, without occluding (filling) the apertures with the laminate. Various approaches and process conditions, e.g. used in combination, can enable this to be achieved.

One general approach has been found to yield advantageous results. This is the use of a sacrificial substrate positioned on the opposite side of the apertured fabric from the retroreflective laminate (that is, on the side of the fabric that will be the inward side in the final garment). It has been found that when the retroreflective laminate is pressed against the outward surface of the fabric in the lamination process, the laminate can deform (bulge) into the apertures of the fabric. This can be carried out so that the surface of the adhesive layer of the laminate can contact, and bond to, the surface of the sacrificial substrate that is exposed at the inward ends of the apertures. When the lamination process is over and the sacrificial substrate is separated from the fabric/laminate assembly, (e.g. when the substrate is peeled off of the inward major surface of the apertured fabric), the areas of the adhesive that were bonded to the sacrificial substrate (along with the binder that is atop this area of adhesive), will be removed along with the substrate. That is, these areas of the adhesive and the binder material will separate from the adhesive and binder material respectively surrounding them, so that these local areas of the laminate remain bonded to the sacrificial substrate. The result is that separating the sacrificial substrate from the apertured fabric removes the laminate from the inward openings of the apertures and leaves the apertures in an unoccluded condition as shown in FIG. 3.

The composition, physical properties (e.g. stiffness), and in particular the surface properties of the sacrificial substrate may be chosen to enhance the ability of the adhesive to bond to the surface of the substrate to achieve the effects described above. The sacrificial substrate may be any suitable material, e.g. a fabric, a polymeric film, and so on.

In many embodiments such a sacrificial substrate will not be pre-attached to the apertured fabric prior to the lamination process. (Rather, both layers will be positioned within a platen press at the time of lamination.) Such an arrangement is distinguished from, for example, an approach in which a sacrificial substrate is attached to an apertured fabric prior to either of these items being input to a lamination process.

The brief mentions earlier herein that it may be advantageous for the apertures 11 to be rather short and squat (rather than having a high length-to-width ratio), and to have a rather low aspect ratio, can now be appreciated. That is, such conditions may make it easier for the laminate to deform into and through the aperture sufficiently far to contact the sacrificial substrate. The various dimensions and ratios presented earlier herein have been found to be adequate in this regard.

It has already been discussed that a retroreflective laminate as disclosed herein will be unsupported, meaning that it does not include any supporting layer such as a polymeric film or fabric layer. It can now be understood that the absence of such a supporting layer will make it easier for the laminate to deform into and through the apertures of the fabric. (The composition of the binder layer and the adhesive layer can also be chosen e.g. to be relatively elastomeric, deformable, etc., to further enhance this ability.) Still further, the lamination process can be carried out with a retroreflective laminate that is "linerless". That is, any liner that is present on the laminate as received, will be removed before the lamination process. This obviously includes any liner that may have been present to protect the adhesive (e.g. if the adhesive was sufficiently tacky to require the use of a liner for handling and storage).

However, if there is a "backside" liner (that is, a liner on the opposite side of the binder layer from the adhesive, i.e. on the outer side of the retroreflective laminate), it must also be removed before lamination. (The position that would be occupied by such a liner, had the liner not been removed before lamination, is indicated by reference numeral 74 in FIG. 2.) This goes against conventional practice in the production of retroreflective articles and the bonding of such articles to fabrics. Typically, retroreflective articles that comprise microspheres as disclosed herein, are built starting with a liner (often called a carrier). In conventional practice, such a liner is softened (e.g. by heating) and a multiplicity of transparent microspheres are partially embedded into the liner. A reflective layer (e.g. a metal coating) is then applied to the exposed portions of the microspheres. A binder precursor (e.g. a polymeric resin) is then coated onto the liner, covering the exposed portions of the microspheres, and is hardened to form the binder layer. An adhesive layer is then deposited atop the binder layer. The resulting article is then stored until such time as it is to be attached to a fabric.

To perform the attachment, the article, with the liner still present, is positioned on a fabric with the adhesive in contact with the fabric. The resulting stack is then heated to bond the adhesive to the fabric. This entire process is typically carried out with the original liner (carrier) still present. Only after the article is bonded to the fabric is the liner/carrier removed.

Such a process, as conventionally known in the art, has the advantages that the liner/carrier can stabilize the retroreflective article and in particular can minimize any stretching or warping of the retroreflective article during handling. Such considerations may be important e.g. for large-scale operations that involve roll-to-roll handling of the retroreflective article. However, the present work has revealed that for lamination operations of the type disclosed herein, it is possible to remove any such liner/carrier from the retroreflective laminate before the laminate is bonded to the fabric without undue deformation or damage to the laminate. And, the present discussions make it clear that the absence of any such liner/carrier on a laminate will significantly reduce the stiffness of the laminate and will make it easier for the laminate to deform into and through the apertures of the fabric.

If a retroreflective laminate is particularly weak or otherwise difficult to handle in the absence of a backside liner/carrier, a slightly modified lamination procedure may be used. For example, the laminate may be placed on a desired apertured fabric with the backside liner still in place. Mild heat and/or pressure can then be applied to tack the laminate in place. With the laminate tacked to the fabric in this manner, the backside liner can be removed, after which the full lamination process (with temperature and/or pressure as described herein) can be performed.

Beyond the above-discussed guidelines of choosing an appropriate sacrificial substrate, choosing appropriate dimensions of the apertures, performing the lamination in the absence of a liner/carrier, and so on, another approach has been found to yield particularly advantageous results. This is the use of a compliant pad behind the retroreflective laminate, in the lamination process. It has been found that the presence of such a compliant pad can significantly enhance the ability of the laminate to deform into and through the apertures of the fabric. (In other words, the compliant pad can help to urge the laminate into the apertures.)

By a compliant pad is meant a pad that exhibits a Shore OO hardness of 100 or less. In various embodiments, such a pad may exhibit a Shore OO hardness of less than 90, 80, 70, 60, 50, 40, 30, or 20. In some embodiments, such a pad may exhibit a Shore OO hardness of at least 5, 10, or 15. Such a compliant pad may be made of any suitable material, e.g. silicone rubber, to ensure that the binder (and the transparent microspheres) will not adhere to the pad under the conditions of lamination. In various embodiments, such a pad may be a dense material (e.g. a silicone rubber lacking voids or porosity); or, the pad may be e.g. a foam or fibrous material, e.g. a woven or nonwoven textile or a leather material, as long as it exhibits the necessary compliance. The above-cited Shore values will be measured at room temperature (21 degrees C.). It will be appreciated that the actual hardness of any such pad may change with temperature, e.g. the pad may become slightly softer at the temperatures used in lamination. Any such phenomena will be taken into account when choosing a pad with a particular room temperature Shore value.

In some embodiments, a lamination process as disclosed herein may be carried out with a platen press. In such cases, the compliant pad may be placed between the retroreflective laminate and a platen of the lamination press, that is, on the side of the laminate that will become the outer side in the finished garment. In such a lamination process, either or both of the platens (the platen behind the laminate and compliant pad, and/or the platen behind the sacrificial substrate) may be heated. If the platen behind the laminate and the compliant pad is heated, it may be beneficial that the compliant pad comprise a high thermal conductivity (e.g., higher than that of conventional silicone rubbers) so that the heat may be transmitted through the pad. Compliant pads with enhanced thermal conductivity (e.g. by way of incorporating thermally-conductive fillers into a silicone rubber) are available from a number of sources. Such compliant pads include e.g. various products available from T-Global Technology, Lutterworth, UK, under the general trade designations TG-A and TG-AK. Such pads may exhibit a thermal conductivity in the range of e.g. 2-18 W/mK (in contrast to conventional silicone rubbers, which typically exhibit a thermal conductivity in the range of 0.2-0.4 W/mK). If the platen behind the sacrificial substrate is heated, it may not be necessary that the compliant pad that is behind the retroreflective laminate exhibit a high thermal conductivity, although this may be arranged if desired. In various embodiments, such a pad may be at least 1.0, 1.5, 2.0, 3.0, 4.0, 6.0, or 8.0 mm in total thickness. In further embodiments such a pad may be at most 10, 7, 5 or 2.5 mm thick. The thickness of the pad may impact the thermal conductivity that may be required of the pad; i.e. a relatively thin pad may not need a very high thermal conductivity.

Such arrangements may be varied as desired. For example, two compliant pads may be used, one positioned behind the retroreflective laminate and one behind the sacrificial substrate. Either or both platens may be heated, and the choice of conventional compliant pads versus compliant pads with enhanced thermal conductivity can be made accordingly. It is possible that a compliant pad positioned behind the sacrificial substrate may serve to urge the sacrificial substrate into the apertures so as to be more easily contacted by the adhesive of the retroreflective laminate and thus may enhance the effects disclosed herein. However, work so far has indicated that a single (heat-conductive) compliant pad, located behind the retroreflective laminate, can provide excellent results. In some embodiments, one or more compliant pads may be inserted into a platen press along with the laminate and the fabric to form a stack. In some such embodiments the pad may be used numerous times (e.g. more than 10). In other embodiments, the pad may only be used a few times (e.g. 10, 5, or 2 uses, or even a single use), e.g. it may take the form of a piece of compliant fabric that is used and then disposed or recycled. In some embodiments, it may be possible to attach a compliant pad to a platen of the press so that the pad can be used multiple times without being removed from the press. The composition of the pad (or at least the composition of a major surface of the pad that will face the binder layer) may be chosen so that the pad and binder layer will not adhere to each other (and/or that any adhesive that may come in contact with the pad, will not adhere to the pad) under the conditions used in laminating the retroreflective laminate to the fabric.

The above-discussed factors can operate, e.g. in combination, to achieve a particularly advantageous result. (While not wishing to be limited by theory or mechanism, it may be that the use of a compliant pad in the lamination process is particularly helpful in this regard.) This advantageous result is illustrated in generalized, representative manner in FIG. 4, which is an isolated, magnified view of one of the apertures of FIG. 3.

As discussed in detail above, the above-discussed lamination process can dispose a retroreflective laminate 50 on a major surface of an apertured fabric 10, without occluding the apertures 11 of the fabric, as shown in FIG. 4. However, the present work has revealed that the approaches disclosed herein can not only dispose a retroreflective laminate 50 on an apertured fabric 10 without occluding the apertures 11 of the fabric, such arrangements can actually provide that, at least for some of the apertures 11, a "flange" portion 81 of retroreflective laminate 50 can actual "wrap" inwardly into an aperture 11 in the general manner shown in FIG. 4. Although not viewable in its entirety in FIG. 4, it is believed that such a flange will typically extend around the entirety of aperture 11; e.g., if the aperture 11 of FIG. 4 is circular, flange 81 would take the form of an annular ring. In some embodiments, the flange 81 will, at least at one location 84 along the "length" of aperture 11, define the circumferential boundary of the aperture as illustrated in idealized manner in FIG. 4. By this is meant that at such a location 84, the actual diameter of the aperture will be defined by the retroreflective material of the flange and will be slightly smaller than the original diameter of the aperture as defined by the fabric sidewalls 22.

It also appears that at least in some instances, the lamination process can cause a flange 81 that is wrapped inwardly into an aperture 11, to become adhesively bonded to the sidewall 22 of the aperture by the adhesive layer 63 of the laminate. Thus for example with reference to FIG. 4, a portion of flange 81 may be bonded by the adhesive (not shown specifically in FIG. 4) to sidewall 22, e.g. at least at location 23.

Still further, the present work has revealed that a flange 81 of retroreflective laminate 50 may wrap inwardly into an aperture 11 so that at least at some location on the flange 81, the outer surface 53 of the retroreflective laminate faces a direction that is offset from the inward-outward axis of the apertured fabric. In other words, the act of deforming a flange 81 of the retroreflective laminate into the aperture can cause the outer surface 53 of the flange to no longer be parallel to the outer surface 53 of the retroreflective laminate at other locations. (In other locations, e.g. not near apertures 11, the outer surface 53 of the retroreflective laminate will typically be parallel to the major plane of the fabric 10).

Such a circumstance is illustrated in generic representation in FIG. 4. The offset between the direction that the outward surface 53 of the laminate faces on a flange 81 and the inward-outward axis of the assembly can be characterized by way of an axis 82 that is drawn locally normal to the plane of outer surface 53 at a location 85 on flange 81, as shown in exemplary embodiment in FIG. 4. The offset is the angular difference between axis 82 and the inward-outward axis of the assembly. (In FIG. 4, this offset is in the range of approximately 70-75 degrees.) In various embodiments such an offset may be at least 10, 20, 30, 40, 50, 60 or 70 degrees. In further embodiments, such an offset may be at most 90, 80, 65, 55, 45, 35 or 25 degrees. Such an offset may be characterized experimentally e.g. by cutting a cross-sectional sample of an aperture and the associated flange and performing optical or scanning electron microscopy. The offset may vary at different locations, e.g. it may be greater for portions of flange 81 that are deeper in aperture 11. In order for an offset to qualify as being greater than a certain value, it is only necessary that the offset exceed this value at any location within the aperture.

The local deviations in the direction faced by outer surfaces 53 of flange portions 81 of retroreflective laminate 50 can be quite useful, as revealed by the following discussion. Those of ordinary skill in the art will appreciate that many retroreflective articles exhibit extremely good retroreflectivity (as manifested e.g. as a very high Coefficient of Retroreflectivity) in essentially head-on light (that is, at low angles) but may exhibit sharply reduced retroreflectivity at very high angles (such angles are often referred to as "glancing" or "grazing" angles). This is a natural consequence of the optical pathways that are established by the arrangements (e.g. a set of reflective microspheres) used. The present work has revealed that the presence of inwardly-wrapped flanges 81 in apertures of a retroreflective laminate can provide a significant boost in retroreflectivity at high angles. (Such angles can be with respect to the incident light, the viewing angle, or typically both.)

Figure 6:
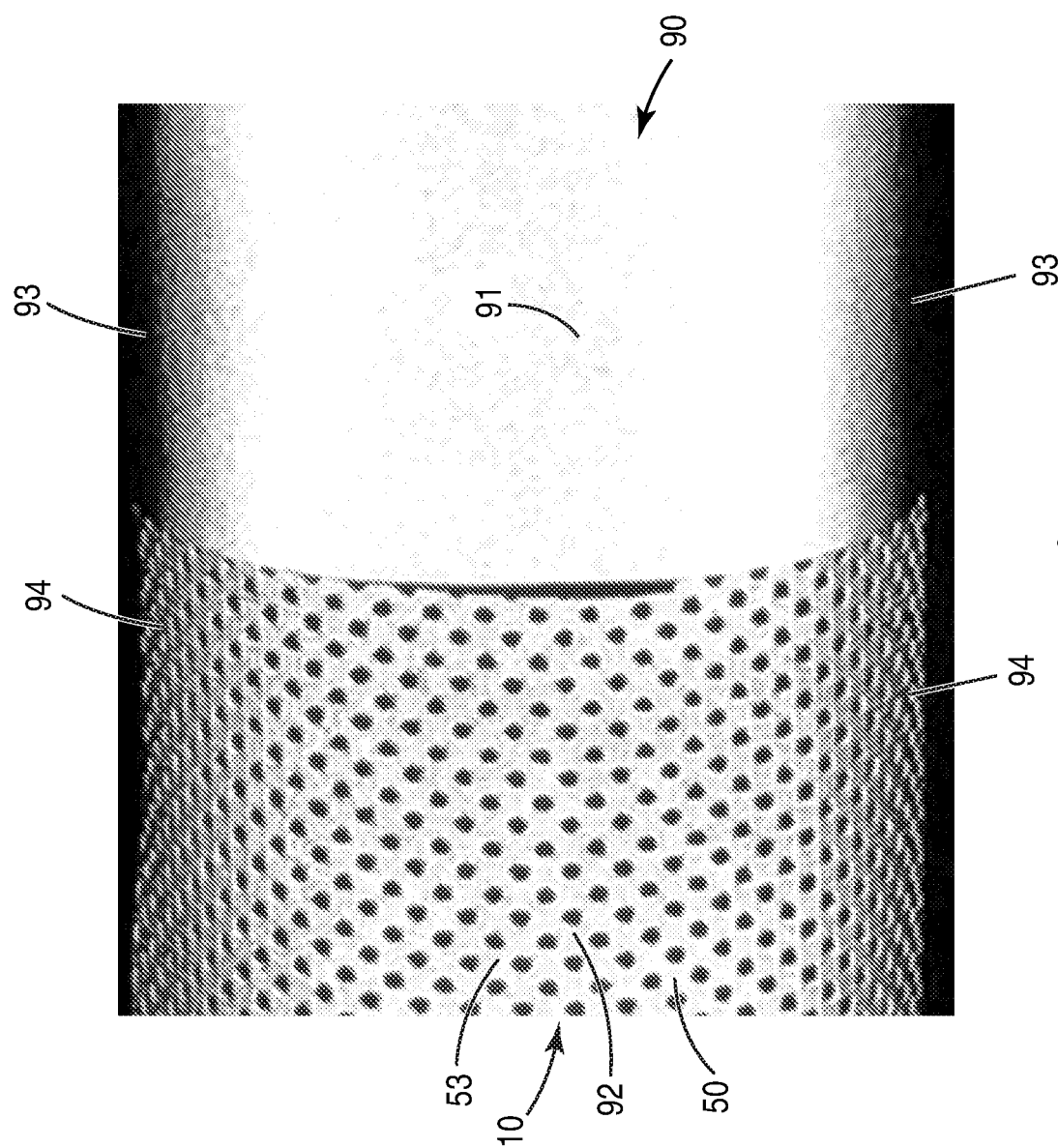
FIG. 6 is a front-view photograph of an exemplary sample of another apertured fabric bearing an exemplary retroreflective laminate, and of a comparative example retroreflective sheet, with both samples being curved around a cylinder.
Figure 7:
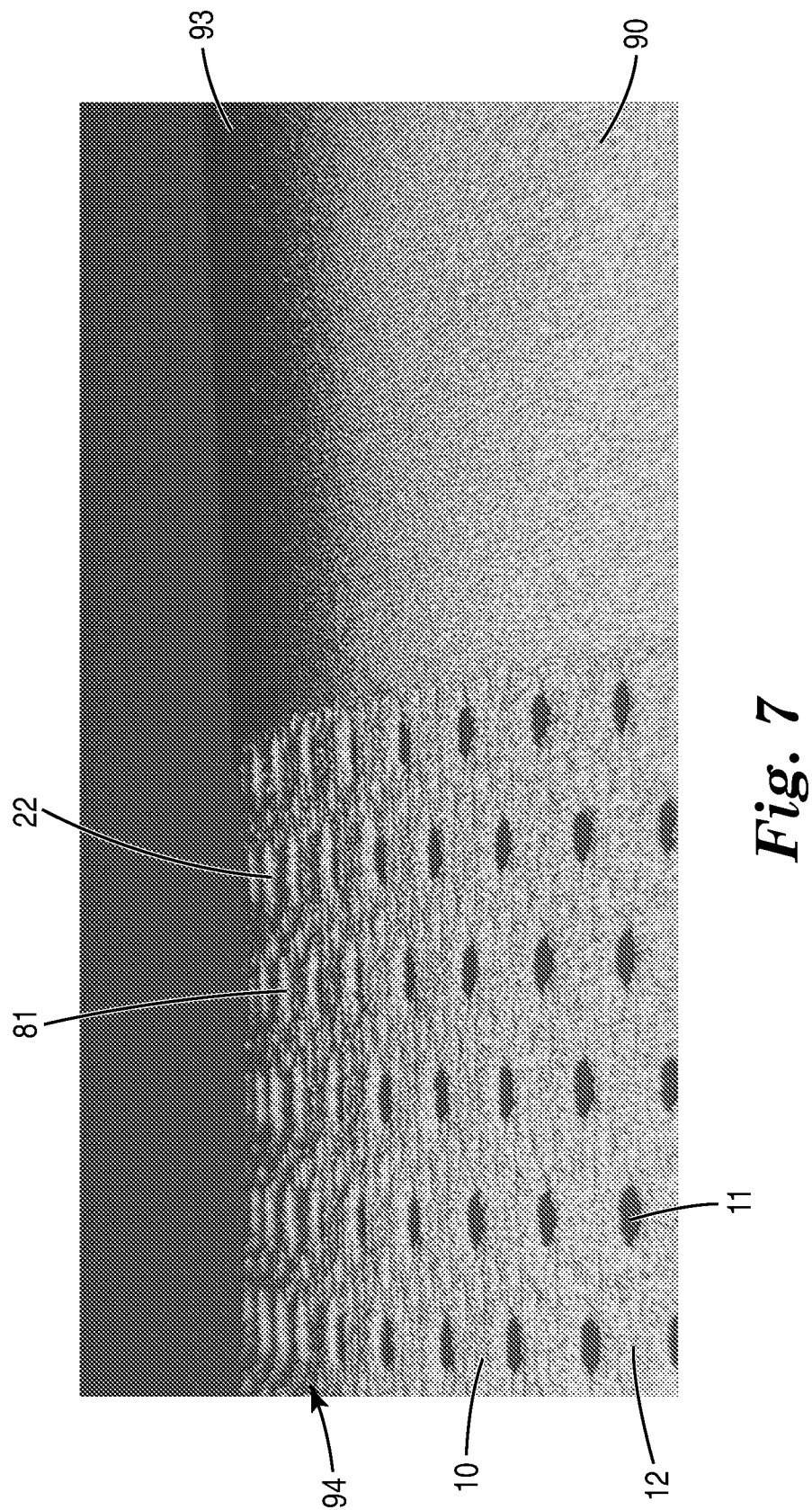
FIG. 7 is a close-up front-view photograph of an exemplary sample of apertured fabric bearing an exemplary retroreflective laminate, and of a comparative example retroreflective sheet, with both samples being curved around a cylinder.

This is attested to in FIGS. 6 and 7. FIG. 6 is a photograph (taken with an iPhone X) of a Working Example sample of apertured fabric 10 bearing a retroreflective laminate 50, alongside a Comparative Example sample 90 of retroreflective film. Both of the samples are mounted on (wrapped onto) on a 3 inch diameter cylinder. As expected, both samples exhibit excellent retroreflectivity in areas 91 (of the Comparative Example sample) and 92 (of the Working Example sample) that are viewed more or less head-on. (No particular attempt was made to control the lighting conditions other than using the flash of the iPhone to illuminate the samples.) The retroreflectivity of the Comparative Example sample falls off essentially completely at the edges of the sample, which are at a very high (glancing) angle. In fact, areas 93 at the edge of the sample are almost completely dark.

In contrast, the retroreflectivity of the Working Example sample is remarkably well retained even at a very high, glancing angle at the very edges of the curved sample, as indicated by areas 94 of FIG. 6.

Such results are presented even more strikingly in FIG. 7, which is a magnified view of edges of a Working Example sample and a Comparative Example sample 90, curved in similar manner as in FIG. 6. Again, it is evident that the retroreflectivity of the Comparative Example 90 has vanished almost completely at high-angle location 93. In contrast, the similar high-angle location 94 of the Working Example sample still exhibits significant retroreflectivity. Moreover, in this magnified view, it appears that much of this retained retroreflectivity at high angles is provided by the flanges 81 of retroreflective laminate 50 that have wrapped into apertures 11. That is, in FIG. 7 it appears that flanges 81 that are present on sidewalls 22, are visible as bright, elongated patches in high-angle area 94.

This seems to indicate that the advantageous retention of retroreflectivity at high angles is at least partly, or even substantially, due to flanges 81 that are wrapped into apertures 11 and that consequently face directions that are different from the direction (the inward-outward direction) that the majority of retroreflective laminate 50 faces. This can enhance the retroreflective performance at high angles, without unacceptably detracting from the performance at low angles.

Moreover, photographs such as those presented in FIGS. 5-8, along with other observations in the present work, indicate that the flanges 81 seem able to penetrate rather deeply into aperture 11. That is, with reference to FIG. 4, a flange 81 seems to not be limited to wrapping only into the outer, entry portion 21 of an aperture 11. Rather, the lamination process seems to enable flanges 81 to penetrate more deeply into the apertures so as to cover a significant portion of sidewalls 22 of apertures 11.

The generic illustration of FIG. 4 shows a flange 81 that has penetrated approximately 20% into the total length (depth) of an aperture 11 of a fabric 10. However, the present work has indicated that in some instances flanges 81 may be able to penetrate even deeper into apertures 11. Thus in various embodiments, a flange 81 may be able to penetrate e.g. 10, 20, 30, 40, 50%, or even more, into the total length of aperture 11. Such penetration will be measured from the major outer surface 12 of the fabric, to the deepest tip 83 of flange 81, and will be ratioed to the thickness of the fabric from major outer surface 12 to major inner surface 13, to provide the result as a percentage.

It is thus evident that in some instances a significant fraction of the area of sidewalls 22 of apertures 11 may be occupied by retroreflective laminate 50. At higher viewing angles, more and more of this retroreflective material may become effective to contribute to the observed retroreflectivity and thus may contribute to the enhanced retention of high-angle retroreflectivity discussed above. In fact, it has been found that Working Example samples have been able to pass a "32-angle" retroreflectivity test (as described in Table 5 of ANSI 107-2015), which takes into account the retroreflective performance at high angles.

Figure 8:
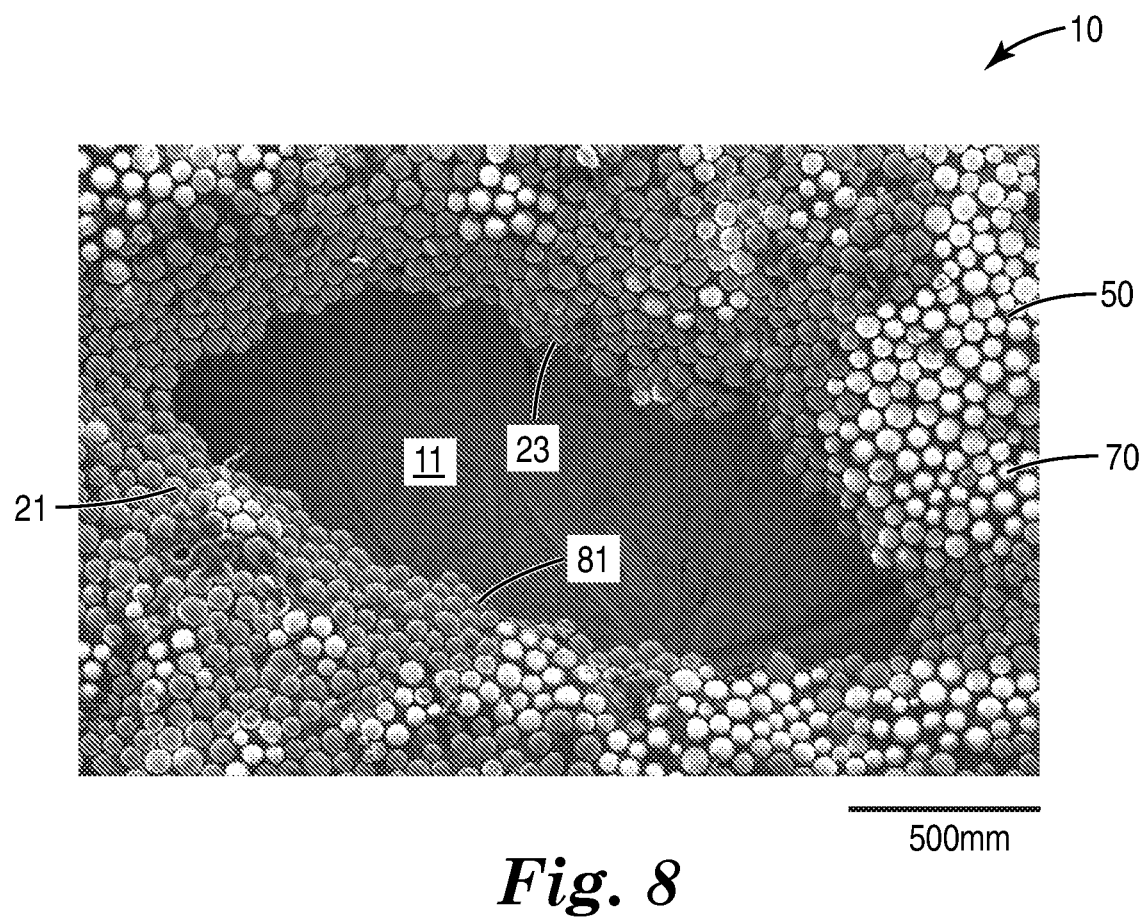
FIG. 8 is a 50×SEM photograph of an exemplary aperture of a fabric, showing a flange of an exemplary retroreflective laminate having wrapped into the aperture.

The above-described phenomena are further evidenced by FIG. 8, which is a 50× scanning electron microphotograph of a representative aperture 11 of an apertured fabric 10 to which an exemplary retroreflective laminate 50 has been laminated. At this magnification, the microspheres 70 of retroreflective laminate 50 are easily seen. It is evident from FIG. 8 that flange portions 81 of retroreflective laminate 50 have not only wrapped into the entry 21 of aperture 11, but in fact appear to have penetrated very deeply into the aperture so as to cover the vast majority of sidewalls 23 of the aperture.

The initial aim of the present work was to achieve lamination of an unsupported retroreflective laminate 50 onto an apertured fabric 10 in such a way as to keep from occluding the apertures 11 of the fabric, with the goal of preserving the breathability of the fabric. With reference to the photograph of a Working Example sample in FIG. 5, a comparison of the appearance of apertures 11 in areas 15 where no retroreflective laminate is present, to the appearance of apertures 11 in areas 14 bearing a retroreflective laminate, reveals that this has been achieved. However, a further result was achieved, namely, the enhanced retention of retroreflectivity at high incidence and/or viewing angles. This is a surprising result, there being no teaching in the art that indicates that lamination of the type described herein can result in "wrapping" of an unsupported retroreflective layer into apertures of an apertured fabric and/or that indicates that such an occurrence can enhance high-angle retroreflectivity.

It is particularly surprising that avoiding occlusion of the apertures, and wrapping of the retroreflective layers into the apertures with resulting enhanced retroreflectivity, can both be achieved. That is, it is surprising that forcing the retroreflective laminate into the apertures and disposing the retroreflective laminate onto the sidewalls of the apertures; and, doing this without unacceptably occluding the apertures, can be achieved. However, the photographs presented in FIGS. 5, 6 and 7 attest to this achievement.

Still further, it appears that much of the area of the above-described flanges 81 may be bonded to the sidewalls 22 of the apertures 11 by the adhesive layer 63 of the retroreflective laminate. This is evidenced by the Wash Durability exhibited by Working Example samples. Specifically, any drop in the retroreflective performance of Working Example samples with multiple washings seems to be of a similar magnitude as that characteristically observed with conventional retroreflective articles. (A steeper drop in retroreflective performance would be expected if portions of the retroreflective laminate are successively removed with each washing.) This apparent bonding of the flanges 81 to the sidewalls 22 of the apertures 11 during lamination, is likewise a surprising result.

Additional descriptions of various components (e.g. binder, transparent microspheres, and so on) will be briefly provided. However, such components are described in detail in numerous patent documents and so will not be described in detail herein.

As noted earlier, binder layer 60 holds and retains transparent microspheres 70 and presents them in such a manner that they can achieve a retroreflective effect. Binder layer 60 also imparts retroreflective laminate 50 with sufficient mechanical integrity so that laminate 50 can, in the absence of any additional supporting layer, be processed and handled, e.g. laminated to a fabric. In various embodiments, binder layer may exhibit an average thickness of from e.g. 30 to 250 micrometers. Under conditions of lamination as disclosed herein, binder layer 60 will soften and become deformable to an extent to allow the herein-described effects to be achieved. Specifically, the binder layer should be able to deform into an aperture in the manner described; and, it must be able to be sundered apart at the locations where part of the binder is bonded to the sacrificial substrate and part of the binder remains within the aperture to form the flange. Thus, in many embodiments, the binder should be a thermoplastic material rather than a thermoset material (although in some particular embodiments, it might be a thermoset (networked) material that is nevertheless weak enough at the lamination temperature, to allow the binder to deform and separate in the manner described herein).

Binder layer 60 may be of any suitable composition. In some embodiments, binder layer 60 may be a composition of the general type disclosed in U.S. Provisional Patent Application No. 62/785,326 and in resulting PCT application WO2020/136531, which is incorporated by reference in its entirety herein. Such compositions may comprise e.g. styrenic block copolymers in combination with one or more suitable tackifiers, e.g. tackifiers comprising non-carbon hetero-atom functionality. In some embodiments, binder layer 60 may be a composition of the general type disclosed in U.S. Provisional Patent Application No. 62/785,344 and in resulting PCT application WO2020/136567, which is incorporated by reference in its entirety herein. Such compositions may comprise e.g. at least one tackifier and at least one elastomer selected from at least one of natural rubbers and synthetic rubbers (e.g. an elastomeric styrenic block copolymer).

In some embodiments, binder layer 60 may be of a composition of the general type disclosed in U.S. Provisional Patent Application No. 62/522,279 and resulting PCT application WO2018/236783, and in U.S. Provisional Patent Application No. 62/527,090 and resulting PCT application WO2019/003158, all of which are incorporated by reference in their entirety herein. These documents describe various curable (meth)acrylate formulations that may be useful for forming a "bead bond layer" (e.g. i.e. a binder layer). For example, the US'090 document describes compositions that may comprise polymerized units of one or more (meth) acrylate ester monomers derived from an alcohol containing 1 to 14 carbon atoms, and at least one of urethane acrylate polymer or acrylic copolymer. The US'279 document describes compositions that may comprise polymerized units of one or more (meth)acrylate ester monomers derived from an alcohol containing 1 to 14 carbon atoms, and polyvinyl acetal resin. Still other potentially suitable binder compositions are described in U.S. Patent Application Publications 2017/0276844, 2020/0264352, and 2020/0264349, all of which are incorporated by reference in their entirety herein.

Adhesive layer 63 of retroreflective laminate 50 may be of any suitable type, as discussed earlier herein. Various adhesives are described in U.S. Patent Application Publication No. 2017/0276844, which is incorporated by reference in its entirety herein. It is noted that the composition of a sacrificial substrate that is used in the lamination process may be chosen in view of the composition of the adhesive 63 of the retroreflective laminate. For example, if the adhesive 63 is a polyester-based adhesive, the sacrificial substrate may be a polyester-based material (e.g. a polyester fabric). Such measures can ensure that the adhesive 63 will bond to the sacrificial substrate at the bottom of the apertures of the aperture fabric in the manner described herein. In some embodiments it may only be necessary that the surface of the sacrificial substrate may be of a composition that is compatible with the adhesive of the retroreflective laminate. For example, if adhesive 63 is a polyurethane-based adhesive, the sacrificial substrate may comprise a surface coating of polyurethane.

It may be desirable that the compositions of the various items be chosen so that the bond between adhesive 63 and binder layer 60 is sufficiently strong (e.g. stronger than the bond that is established between adhesive 63 and the sacrificial substrate) that adhesive 63 will not separate from binder layer 60. In other words, the goal is that both adhesive 63 and binder layer 60 (rather than only adhesive 63) will transfer to the sacrificial substrate to leave behind an unoccluded aperture in the fabric.

Transparent microspheres 70 as used in a retroreflective laminate may be of any suitable type. The term "transparent" is generally used to refer to a body (e.g. a glass microsphere) or substrate that transmits at least 50% of electromagnetic radiation at a selected wavelength or within a selected range of wavelengths. In various embodiments, transparent microspheres may be made of e.g. inorganic glass, and/or may have a refractive index of e.g. from 1.7 to 2.0. In various embodiments, the transparent microspheres may have an average diameter of at least 20, 30, 40, 50, 60, 70, or 80 microns. In further embodiments, the transparent microspheres may have an average diameter of at most 200, 180, 160, 140 120, 100, 80, or 60 microns. The vast majority (e.g. at least 90% by number) of the microspheres may be at least generally, substantially, or essentially spherical in shape. However, it will be understood that microspheres as produced in any real-life, large-scale process may comprise a small number of microspheres that exhibit slight deviations or irregularities in shape. Thus, the use of the term "microsphere" does not require that these items must be e.g. perfectly or exactly spherical in shape.

In various embodiments, in a retroreflective laminate 50, a microsphere 70 may be partially embedded in binder layer 60 so that on average, from 15, 20 or 30 percent of the diameter of the microsphere, to about 80, 70, 60 or 50 percent of the diameter of the microsphere, is embedded within the binder layer. Typically, the microspheres will be at least slightly laterally spaced apart from each other although occasional microspheres may be in lateral contact with each other. In various embodiments, the microspheres may be present on the binder at a packing density of at least 30, 40, 50, 60 or 70 percent, and/or at most 80, 75, 65, 55 or 45 percent.

In some embodiments, a minor reflective layer 73 operating in combination with a transparent microsphere 70 to provide a retroreflective element may comprise a metal layer, e.g. a single layer, or multiple layers, of vapor-deposited metal (e.g. aluminum or silver), or of metal alloy. In some embodiments, a minor reflecting layer may take the form of a dielectric reflecting layer, comprising an optical stack of pairs of high and low refractive index sublayers that are arranged in series along the optical path to provide reflective properties in combination. In various embodiments, one, two, three, or more pairs of high/low refractive index sublayers may be present. Dielectric reflecting layers are described in further detail in U.S. Patent Application Publication No. 2017/0131444, which is incorporated by reference in its entirety herein.

In some embodiments at least some of the retroreflective elements (e.g. transparent microspheres in combination with reflective layers) of a herein-disclosed retroreflective laminate 50 may comprise at least one minor color layer. The presence of color layers in at least some of the retroreflective light paths of a retroreflective laminate can allow the laminate to comprise at least some areas that exhibit colored retroreflected light, irrespective of the color(s) that these areas (or any other areas of the laminate) exhibit in ambient (non-retroreflected) light. Color layers are described in further detail e.g. in U.S. Provisional Patent Application No. 62/675,020 and the resulting International Patent Application Publication WO2019/084297, both of which are incorporated by reference in their entirety herein. All optical layers such as e.g. color layers and reflective layers and sublayers thereof, will typically be extremely thin (e.g. less than 5 microns) and non-structural and thus will be considered to be "minor" layers as discussed earlier herein. In some embodiments the retroreflective laminate may be configured to exhibit a particular color in ambient (non-retroreflected) light, irrespective of any color that is exhibited in retroreflected light. This may be achieved for example by loading the binder layer with any desired pigment, dye or the like.

Various products comprising a binder layer bearing transparent microspheres and reflective layers, and an adhesive layer, but without having any supporting layer, are commercially available and may serve as a retroreflective laminate as disclosed herein. Such products include e.g. various products available from 3M Company, St. Paul MN, under the trade designations SCOTCHLITE REFLECTIVE MATERIAL TRANSFER FILM C725, C750, C750R, C790, 8712, 8725, 5510, and 5807. Some such products, as supplied, may include an adhesive-side liner that will be removed before lamination. Some such products, as supplied, may include a backside (outer) liner. According to the disclosures herein, such a liner should be removed before lamination (or, the product may be lightly tacked to an apertured fabric after which the backside liner is removed for full lamination, as described elsewhere herein.)

After a retroreflective laminate 50 as disclosed herein is produced or obtained, the laminate may be stored in any suitable format, and/or may be further processed as desired.

In some convenient embodiments, a temporary carrier (liner), if present, can be left in place until such time as the carrier is removed prior to lamination as discussed above. The retroreflective laminate may of course be e.g. cut to any desired shape in preparation for being laminated to an apertured fabric.

In many embodiments, one or more retroreflective laminates 50 may be laminated directly to an apertured fabric 10 that will provide a garment 1. However, the approaches disclosed herein (in particular, arrangements that allow lamination to an apertured fabric in such manner as to not occlude the apertures, while nevertheless allowing flanges of the laminate to wrap into the apertures) are not necessarily limited to "direct" disposition of the laminate onto a garment. Thus in some instances, the approaches disclosed herein may be used e.g. to provide an article in the form of a piece of "trim" of the general type mentioned previously. In such embodiments, such a "trim" piece, comprising an apertured fabric bearing a retroreflective laminate as described herein, may be coupled to a garment (or to any other object) e.g. by sewing, by use of an adhesive, or by any other suitable method.

By a retroreflective laminate is meant a laminate that exhibits a Coefficient of Retroreflectivity of at least 50 candela per lux per square meter, measured (at 0.2 degrees observation angle and 5 degrees entrance angle) in accordance with the procedures outlined in U.S. Patent Application Publication Nos. 2017/0276844 and 2017/0293056. In various embodiments, such a retroreflective laminate may exhibit a Coefficient of Retroreflectivity of at least 100, 200, 250, 330, 350, or 450 candela per lux per square meter when tested according to such procedures.

In various embodiments, retroreflective laminates (and/or garments bearing such laminates) as disclosed herein may meet the photometric and/or physical performance requirements for retroreflective materials per ANSI 107-2015 and/or ISO 20471:2013. (In particular, the fabric of such a garment may exhibit a minimum luminance factor such that the fabric is considered to be fluorescent as defined herein.) In many embodiments, retroreflective laminates as disclosed herein comply with the requirements for the minimum Coefficient of Retroreflection as shown in Table 5 of ANSI 107-2015 (i.e. a so-called "32-angle" test).

In some embodiments, retroreflective laminates as disclosed herein may exhibit satisfactory, or excellent, wash durability. In some embodiments such wash durability may be manifested as high $R_A$ retention (a ratio between $R_A$ after wash and $R_A$ before wash) after numerous (e.g. 25) wash cycles conducted according to ISO 6330 Method 2A, as outlined in U.S. Patent Application Publication No. 2017/0276844. In various embodiments, a retroreflective laminate as disclosed herein may exhibit a percent of $R_A$ retention of at least 10%, 30%, 50%, or 75% after either of the above-listed washing methods is performed. In various embodiments, a retroreflective laminate as disclosed herein may exhibit any of these retroreflectivity-retention properties in combination with an initial $R_A$ (before any washing) of at least 100 or 330 candela per lux per square meter, measured as noted above.

EXAMPLES

Test Methods

Retroreflectivity Measurement

Coefficients of Reflection (RA, at an observation angle of 0.2° and an entrance angle of 5°), reported in units of candelas per lux per square meter (candelas/lux/meter$^2$), may be obtained following the methods described in U.S. Patent Application Publication No. 2020/0264350, which is incorporated by reference in its entirety herein. In some cases, samples may be evaluated in a "32-angle" test for the minimum coefficient of retroreflection for the 32 angle combinations as described in Table 5 of ANSI 107-2015, which is often used in the evaluation of e.g. safety apparel.

Color Measurement

Color coordinates in ambient light conditions (Y, x, y for fluorescent yellow color, or L*, a*, b* for other colors such as white) may be performed according to the procedures described in the above-cited US '350 Publication.

Wash Durability Test

Wash durability is reported as a percent of $R_A$ retention (calculated as a ratio between $R_A$ after wash and $R_A$ before wash, each measured at an observation angle of 0.2 degrees and an entrance angle of 5 degrees) after indicated (e.g. 25) wash cycles conducted according to the method of ISO 6330 2A. A sample is deemed as "wash durable" under the indicated protocol if the percent retention of $R_A$ (calculated as a ratio between $R_A$ after wash and $R_A$ before wash) after the wash durability test is greater than or equal to 10%.

Representative Working Examples

Working Example samples were prepared according to the following procedure. A fluorescent, apertured fabric was obtained by cutting up a fluorescent yellow (ANSI 107-2015 compliant) high-visibility safety garment (a vest) obtained from 3M Company. The vest fabric (shown in FIG. 5) was approximately 0.5 mm in thickness and comprised apertures (perforations) of an estimated average size of 1.4 square mm and that occupied approximately 7 percent open area (the fabric was thus breathable under the criteria provided herein).

A retroreflective laminate was obtained from 3M Company in the form of SCOTCHLITE REFLECTIVE MATERIAL TRANSFER FILM 8725. This product comprised a binder layer with reflectorized transparent microspheres partially embedded therein, and an adhesive layer. The product was an unsupported laminate (not including e.g. any kind of fabric layer). The adhesive layer was a polyester-based thermoplastic material (thickness approximately 75 μm) that was believed to have been disposed onto the binder layer by heated lamination. The adhesive layer was nontacky at room temperature and no adhesive-side liner was present. A backside liner, if present (8725 is available in two versions, linerless and with a backside liner), was removed. The thickness of the laminate (including the binder and the adhesive, absent any liner) was approximately 0.15 mm. (The ratio of the laminate thickness to the thickness of the apertured fabric was thus approximately 0.3.)

A sacrificial substrate was obtained in the form of a polyester blend fabric. A piece of the sacrificial substrate was placed onto the lower platen of a platen press, followed by the apertured fabric. The retroreflective laminate was then placed atop the apertured fabric, adhesive side down. A heat-conductive compliant pad (several mm thick, believed to be made of silicone with a thermally-conductive additive) was then placed atop the retroreflective laminate to complete the stack.

The platen press was a type in which the upper (moving) platen was heated, with the lower (stationary) platen not being temperature-controlled. The upper platen was heated to a stable set point of approximately 160 degrees C. The upper platen was then brought down and the platens were pressed together to a pressure of approximately 60 psi. This was maintained for a dwell time of approximately 20 seconds, after which the press was opened. After a brief wait for the stack to cool, the stack was removed from the press.

After sufficient cooling, the sacrificial substrate was peeled off of the apertured fabric. Discrete dots of laminate (adhesive and binder layer) were observed to have bonded to the sacrificial substrate and thus to have separated from the remainder of the laminate.

The thus-produced Working Example sample was a fluorescent, apertured fabric bearing an unsupported, retroreflective laminate adhesively bonded thereto. Numerous samples of this general type were made. A photograph of one such sample is presented in FIG. 5. In the particular sample shown in FIG. 5, two retroreflective laminates were laminated to the fabric (simultaneously, in the same lamination operation), at right angles to each other and with an end of one laminate closely abutted against an edge of the other laminate.

Close visual inspection of such samples indicated that at least some amount of "wrapping" of flanges of the laminate into the apertures had taken place. However, as is evident in FIG. 5, the apertures 11 remained open in the areas 14 in which the retroreflective laminate 50 was present. In fact, they appeared very similar to the apertures 11 in areas 15 in which no retroreflective laminate 50 was present. It was thus clear that the apertures remained unoccluded and in fact exhibited a percent open area very close to the original 7%. In other words, even though flanges of the laminate did appear to have wrapped into the apertures so as to extend along at least a portion of the sidewalls of the apertures, the flanges did not appear to drastically reduce the diameter/size of the apertures. The fabric thus remained breathable even in the areas covered by the retroreflective laminate.

The Coefficient of Retroreflectivity (RA, at an observation angle of 0.2° and an entrance angle of 5°), of various samples of retroreflective laminate disposed on apertured fabrics as described above were evaluated. In general the laminates exhibited excellent retroreflectivity (i.e., well above 330 candelas/lux/meter$^2$) and, in particular, did not exhibit a significant fall-off in retroreflectivity from to the discontinuities now present in the retroreflective laminate due to the presence of the apertures. In fact, a representative sample that was subjected to a "32-angle" test as described above, met the criteria required in ANSI 107-2015.

Additional Working Examples

Additional Working Example samples were made in similar manner as described above. For some such samples, a different apertured fabric was used. This fabric was not fluorescent and exhibited apertures of approximately 1.1 square millimeters in size and that occupied a percent open area of approximately 30. The fabric was approximately 0.30 mm.

A retroreflective laminate was obtained from 3M Company in the form of SCOTCHLITE REFLECTIVE MATERIAL TRANSFER FILM C725. This product was an unsupported laminate that was similar to the above-described 8725 product but was softer and more stretchy and thus was less easily able to be handled in the absence of a liner, which necessitated a slight modification to the lamination procedure as described below. The thickness of this laminate (binder plus adhesive) was approximately 0.12 mm.

A sacrificial substrate and a heat-conductive compliant pad were combined with the apertured fabric and the retroreflective laminate to form a stack in similar manner as described above. Prior to placing the retroreflective laminate in the stack, the adhesive-side liner was removed, but the backside liner (atop the binder layer, on the opposite side from the adhesive layer) was left in place. A preliminary pressing operation was performed, using temperatures and pressures similar to those listed above, but with the dwell time shortened to 5-10 seconds. The items were then removed from the press and unstacked. The laminate had bonded sufficiently to the apertured fabric that the backside liner could now be removed. The stack was then reassembled and a full lamination (under conditions, including dwell time, similar to those described above) was performed.

The press was then opened and the stack removed. After sufficient cooling, the sacrificial substrate was peeled off of the apertured fabric. Discrete dots of laminate (adhesive and binder layer) were observed to have bonded to the sacrificial substrate and to have separated from the remainder of the laminate.

The thus-produced Working Example sample was an apertured fabric bearing an unsupported, retroreflective laminate adhesively bonded thereto. Numerous samples of this general type were made. Photographs of two such samples are presented in FIGS. 6 and 7.

Close visual inspection of such samples indicated that at least some amount of "wrapping" of flanges of the laminate into the apertures had taken place. However, the apertures in the areas in which the retroreflective laminate was present, remained open and did not appear to have been drastically reduced in size. The fabric thus remained breathable even in the areas covered by the retroreflective laminate.

Representative samples were wrapped onto 3 inch diameter cylinders in order that the retroreflectivity of the samples at various angles could be qualitatively evaluated. Comparative Example samples, in the form of the original C725 retroreflective material not having been laminated to fabric, were similarly wrapped onto the same cylinders, next to the Working Example samples, for comparison. As evident from inspection of FIG. 6, the Working Example samples exhibited much greater retention of retroreflectivity at high angles (i.e. at the very edges of the cylinders) than the Comparative Example samples. And, the magnified photograph of FIG. 7 seems to indicate that flanges of the retroreflective laminate that had wrapped onto the sidewalls of the apertures contributed significantly to this retained retroreflectivity at high angles, as discussed earlier herein. A 50×SEM photo of a representative aperture is shown in FIG. 8; as discussed earlier, this provides further evidence that the flanges of the retroreflective laminate had wrapped onto the sidewalls of the apertures. A representative sample that was subjected to a "32-angle" test as described above, met the criteria required in ANSI 107-2015.

Variations

Various other Working Example samples were made, varying the components and/or the process conditions. Some such samples, for example, were made using a modified procedure as discussed earlier herein. For these samples, a compliant pad (that did not have to be heat-conductive) was placed on the bottom (non-heated) platen of the press. The retroreflective laminate was then put atop the pad, adhesive side up. The apertured fabric was then placed atop the retroreflective laminate, and the sacrificial substrate was then placed atop the apertured fabric. The movable, heated platen was then brought down onto the stack for the usual dwell time. This method was found to work as well or better than the above-described method.

Various samples were also made with different apertured fabrics. Some such fabrics, for example, were approximately 0.63 mm thick and had apertures that occupied a percent open area of approximately 30. Various samples of this type were successfully provided with laminated retroreflective areas by the methods described above.

Some samples were tested for Wash Durability according to the procedures presented above. Such samples met the criteria in the ISO 6330 2A standard for both initial retroreflectivity and retention of retroreflectivity after 25 wash cycles.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

What is claimed is:

1. A breathable, high-visibility garment comprising:
    an apertured, breathable fabric comprising a multiplicity of apertures that occupy a percent open area of from 3% to 40%, that exhibit a size of at most 20 square mm, and that are in the form of perforations and/or interstitial through-holes;
    and, a non-occlusive, unsupported, retroreflective laminate that is adhesively bonded to an outer major surface of at least one region of the apertured fabric;
    wherein for at least some of the apertures of the apertured fabric, a flange of the retroreflective laminate wraps inwardly into the aperture so as to define a circumferential boundary of the aperture at least at one location within the aperture.

2. The breathable, high-visibility garment of claim 1 wherein for at least some of the apertures, the flange of the retroreflective laminate wraps inwardly into the aperture so that at least at some location on the flange, an outer surface of the retroreflective laminate faces a direction that is off-set from an inward-outward axis of the apertured fabric by at least 20 degrees.

3. The breathable, high-visibility garment of claim 1 wherein for at least some of the apertures, the flange of the retroreflective laminate that wraps inwardly into the aperture is adhesively bonded to a sidewall of the aperture by the adhesive of the retroreflective laminate, at least at some location on the flange.

4. The breathable, high-visibility garment of claim 1 wherein for at least some of the apertures, the flange of the retroreflective laminate wraps inwardly into the aperture so as to penetrate at least 20% into the total length of the aperture.

5. The breathable, high-visibility garment of claim 1 wherein the apertures of the apertured fabric occupy a percent open area of from 5% to 30%.

6. The breathable, high-visibility garment of claim 1 wherein apertures of the apertured fabric in the at least one region in which the retroreflective laminate is adhesively bonded to the outer major surface of the apertured fabric, exhibit an average size that is at least 70% of an average size exhibited by apertures in a region of the apertured fabric that does not have the retroreflective laminate adhesively bonded thereto.

7. The breathable, high-visibility garment of claim 1 wherein the apertures of the apertured fabric exhibit an average size of from 1 mm$^2$ to 4 mm$^2$, an average aspect ratio of less than 2.5, and an average length-to-width ratio of less than 0.4.

8. The breathable, high-visibility garment of claim 1 wherein the apertured fabric is a mesh fabric in which all of the apertures of the multiplicity of apertures are in the form of interstitial through-holes.

9. The breathable, high-visibility garment of claim 1 wherein all of the apertures of the multiplicity of apertures are in the form of perforations.

10. The breathable, high-visibility garment of claim 1 wherein the retroreflective laminate exhibits a Coefficient of Reflection (RA) at an observation angle of 0.2° and an entrance angle of 5° of at least 330 candelas per lux per square meter (candelas/lux/meter$^2$).

11. The breathable, high-visibility garment of claim 1 wherein the retroreflective laminate comprises a binder layer that is positioned outward of the adhesive of the retroreflective laminate and comprises transparent microspheres that are partially embedded in the binder layer so as to exhibit outwardly-exposed portions and embedded portions and that comprise reflective layers on the major surfaces of the embedded portions.

12. The breathable, high-visibility garment of claim 1 wherein the apertured fabric is fluorescent.

13. The breathable, high-visibility garment of claim 1 wherein at least 70% of the at least one region of the apertured fabric to which the retroreflective laminate is adhesively bonded, is in the form of a single layer of the apertured fabric with no other layer of fabric, apertured or non-apertured, being present.

14. The breathable, high-visibility garment of claim 1 wherein the garment is a vest, shirt, jacket, trousers, or coverall that meets all requirements of ANSI 107-2015.

15. A method of adhesively laminating a retroreflective laminate to a major surface of an apertured fabric to form the breathable, high-visibility garment of claim 1, the method comprising:
   disposing, in a heated press, a stack comprising,
      an apertured fabric,
      a linerless, unsupported, retroreflective laminate comprising an adhesive layer that is positioned in contact with a first major surface of the apertured fabric,
      a sacrificial substrate positioned on the opposite side of the apertured fabric from the retroreflective laminate, and
      a compliant pad comprising a Shore OO Hardness of 100 or less, the compliant pad being positioned between the retroreflective laminate and a platen of the heated press;
   closing the heated press under pressure so that the compliant pad urges portions of the retroreflective laminate that overlie apertures in the apertured fabric to enter the apertures and to penetrate through the apertures so as to contact a surface of the sacrificial substrate that is exposed at the bottom of the apertures,
   adhesively bonding portions of the adhesive layer of the retroreflective laminate that are in contact with the first major surface of the apertured fabric, to the first major surface of the apertured fabric; and, adhesively bonding portions of the adhesive layer of the retroreflective laminate that are in contact with the exposed surface of the sacrificial substrate, to the exposed surface of the sacrificial substrate; and,
   opening the heated press and separating the sacrificial substrate from the apertured fabric so that portions of the retroreflective laminate that are adhesively bonded to the sacrificial substrate are removed with the sacrificial substrate leaving the apertures in the apertured fabric as apertures that are not occluded by the laminate.

16. The method of claim 15 wherein the compliant pad is a heat-conductive compliant pad with a thermal conductivity of at least 4.0 W/mK and wherein the heated press is configured so that heat is supplied at least through a platen of the press that is in contact with the heat-conductive compliant pad.

17. The method of claim 15 wherein the compliant pad comprises a thermal conductivity of less than 0.2 W/mK and wherein the heated press is configured so that heat is supplied at least through a platen of the press that is in contact with the sacrificial substrate.

18. The method of claim 15 wherein the apertured fabric is a piece of fabric that has been at least partially cut into the form of a garment prior to being placed in the heated press; and, wherein the method does not include a step of attaching the apertured fabric with the retroreflective laminate adhesively bonded thereto to a separate piece of fabric that is larger than the apertured fabric and that has been at least partially cut into the form of a garment.

* * * * *